(12) United States Patent
Ha et al.

(10) Patent No.: US 7,771,105 B2
(45) Date of Patent: Aug. 10, 2010

(54) LIQUID CRYSTAL DISPLAY DEVICE AND METHOD FOR ASSEMBLING THE SAME

(75) Inventors: Jin-Ho Ha, Suwon-si (KR); Hee-June Kwak, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/752,764

(22) Filed: May 23, 2007

(65) Prior Publication Data

US 2007/0217223 A1 Sep. 20, 2007

Related U.S. Application Data

(62) Division of application No. 09/850,367, filed on May 8, 2001, now Pat. No. 7,230,659.

(30) Foreign Application Priority Data

May 7, 2001 (KR) ................. 2001-24726

(51) Int. Cl.
*F21V 7/04* (2006.01)
(52) U.S. Cl. .............. 362/630; 362/614; 362/457; 362/634; 349/58
(58) Field of Classification Search ......... 362/630, 362/614, 457, 634; 349/58
See application file for complete search history.

(56) References Cited

U.S. PATENT DOCUMENTS

| | | | |
|---|---|---|---|
| 4,415,983 A | 11/1983 | Lachmann et al. | |
| 4,719,314 A * | 1/1988 | Nothnagel et al. | 174/481 |
| 5,048,933 A | 9/1991 | Asano | |
| 5,313,318 A | 5/1994 | Gruenberg et al. | |
| 5,515,303 A | 5/1996 | Cargin et al. | |
| 5,808,708 A * | 9/1998 | Oyama et al. | 349/65 |

(Continued)

FOREIGN PATENT DOCUMENTS

CA 1259724 12/1998

(Continued)

OTHER PUBLICATIONS

English Abstract for JP 04-43225 A, Aug. 31, 1992.

(Continued)

*Primary Examiner*—Sandra L O'Shea
*Assistant Examiner*—Jessica L McMillan
(74) *Attorney, Agent, or Firm*—Innovation Counsel LLP

(57) ABSTRACT

Disclosed are a liquid crystal display device and a method for assembling the liquid crystal display device. The liquid crystal display device has a display section for displaying images, a receiving container for receiving the display section, a power supplying section for supplying a power source to the display section, a signal converting section for converting signals from the display section and a fixing section for fixing the power supplying section and the signal converting section to the receiving container. The power supplying section and the signal converting section are disposed between the display section and the fixing section with directly facing to a rear surface of the receiving container. Accordingly, a total thickness and weight of the liquid crystal display device can be minimized and an assembly facility of the liquid crystal display device can be improved.

10 Claims, 29 Drawing Sheets

U.S. PATENT DOCUMENTS

| | | | |
|---|---|---|---|
| 5,815,227 A * | 9/1998 | Lee | 349/67 |
| 5,966,191 A * | 10/1999 | Lee | 349/58 |
| 5,986,726 A | 11/1999 | Murai | |
| 5,988,827 A | 11/1999 | Lee | |
| 6,016,083 A | 1/2000 | Satoh | |
| 6,181,572 B1 | 1/2001 | Lutz, Jr. | |
| 6,229,695 B1 | 5/2001 | Moon | |
| 6,256,075 B1 | 7/2001 | Yang | |
| 6,339,418 B1 * | 1/2002 | Kitagawa | 345/102 |
| 6,342,932 B1 | 1/2002 | Terao et al. | |
| 6,411,352 B1 | 6/2002 | Kim | |
| 6,522,371 B1 | 2/2003 | Sakamoto et al. | |
| 6,853,409 B2 | 2/2005 | Takeishi | |

FOREIGN PATENT DOCUMENTS

| | | |
|---|---|---|
| CN | 1259724 | 7/2000 |
| JP | 04-243225 A | 8/1992 |
| JP | 04243225 A | 8/1992 |
| JP | 04-359227 | 11/1992 |
| JP | 05-045647 | 2/1993 |
| JP | 6-148670 A | 5/1994 |
| JP | 406148670 A | 5/1994 |
| JP | 8-122775 | 5/1996 |
| JP | 8-122775 | 2/2005 |

OTHER PUBLICATIONS

English Abstract for JP 04-359227, Nov. 12, 1992.
English Abstract for JP 06-148670A, May 27, 1994.
English Abstract for JP 8-122775, May 17, 1996.
English Abstract for CN 1259724, Jul. 12, 2000.
English Abstract for JP 05-045647, Feb. 26, 1993.

* cited by examiner

LIQUID CRYSTAL DISPLAY DEVICE AND METHOD FOR ASSEMBLING THE SAME

CROSS-REFERENCE TO RELATED APPLICATIONS

This application is a Division of U.S. patent application Ser. No. 09/850,367 filed on May 8, 2001, now U.S. Pat. No. 7,230,659, which claims priority to and the benefit of Korean Patent Application No. 2001-24726, filed on May 7, 2001, the disclosures of which are incorporated herein by reference in their entireties.

BACKGROUND OF THE INVENTION

1. Field of the Invention

The present invention relates to a liquid crystal display device, and more particularly, to a liquid crystal display device of which a size and a weight are reduced and an assembly facility is improved and a method for assembling the liquid crystal display device.

2. Description of the Related Art

In these days, information processing devices have been rapidly developed in a trend with various architectures, functions and faster information processing speeds. Information processed in these information processing devices has an electrical signal format. In order to visually confirm information processed in the information processing device, a display for a role as an interface should be provided.

Recently, a liquid crystal display device which is lighter, and smaller than a CRT type display device has been developed. The liquid crystal display device has functions such as full color and high resolution. As a result, the liquid crystal display device is widely used as a monitor for a computer, a television, or another display device.

The liquid crystal display device applies a voltage to a predetermined molecular arrangement of a liquid crystal to convert the molecular arrangement to another molecular arrangement. The liquid crystal display device converts the changes of optical properties to visional changes and uses the modulation of a light by using a liquid crystal cell.

Liquid crystal display devices are divided into a TN (Twisted Nematic) type and a STN (Super-Twisted Nematic) type, and are also divided into an active matrix display type which uses a switching device and a TN liquid crystal and a passive matrix display type which uses a STN liquid crystal according to the driving type.

The active matrix display type is used in a TFT-LCD and drives an LCD by using a TFT as a switch. The passive matrix display type does not use any transistor and does not need a complex circuit.

Further, liquid crystal display devices may be a transparent liquid crystal display device which uses a backlight or a reflective liquid crystal display device which uses an exterior light source according to a method for using a light source.

The transparent liquid crystal display device which uses the back light as a light source has a heavy weight and a large volume by the existence of the back light, but is widely used since it independently displays an image without using an exterior light source.

FIG. 1 is an exploded perspective view schematically showing a conventional liquid crystal display device. FIG. 2 is a sectional view showing the constructions of the liquid crystal display device shown in FIG. 1.

Referring to FIG. 1, the liquid crystal display device has a liquid crystal display module 130 for displaying images when image signals are applied thereto and front and rear cases 110 and 120 for receiving the liquid crystal display module. The liquid crystal display module 130 includes a display unit 170 having a liquid crystal display panel for showing the images and a backlight assembly 150 for supplying a light to the display unit 170.

The display unit 170 includes a liquid crystal display panel 171, a data side printed circuit board 176, a gate side printed circuit board 175, a data side tape carrier package 178 and a gate side tape carrier package 174.

The liquid crystal display panel 171 has a thin film transistor board 172, a color filter board 173 and a liquid crystal (not shown).

The thin film transistor board 172 is a transparent glass board on which the thin film transistors are formed in a matrix shape. Data lines are respectively connected with source terminals of the thin film transistors and gate lines connected with gate terminals of the thin film transistors. Furthermore, pixel electrodes are respectively formed at drain terminals of the thin film transistors, which are comprised of a transparent conductive material such as Indium Tin Oxide (ITO).

The color filter board 173 is provided to face to the thin film transistor board 172. RGB pixels are formed on the color filter board 173 by means of a thin film process, which gives a predetermined color while the light passes through the color filter board 173. Common electrodes made of the ITO are coated on the front surface of the color filter board 173.

When the thin film transistors of the thin film transistor board 172 are turned on by applying a power source to the gate terminals and the source terminals of the thin film transistors, an electric field is formed between the pixel electrodes of the thin film transistor board 172 and the common electrodes of the color filter board 173. The electric field forces the liquid crystal, which is injected between the thin film transistor board 172 and the color filter board 173, to change the array angle thereof, resulting in the transmissivity of the light being changed. As a result, the desired pixels are obtained.

Meanwhile, a driving signal and a timing signal are applied to the gate lines and data lines of the thin film transistor in order to control the array angle of the liquid crystal and the time of arraying the liquid crystal in the liquid crystal display panel 171. As shown in FIG. 1, the data side tape carrier package 178 that is one of the flexible circuit boards, is attached to the source portion of the liquid crystal display panel 171 to decide a time of applying a data driving signal. On the other hand, the gate side tape carrier package 174 is attached to the gate portion of the liquid crystal display panel 171 to decide a time of applying a gate driving signal.

The data side printed circuit board 176 and the gate side printed circuit board 175, which respectively apply the driving signal to the gate line and the data line as soon as each receives image signals input from the outside of the liquid crystal display panel 171, make contact with the data side tape carrier package 178 for the data line and the gate side tape carrier package 174 for the gate line in the liquid crystal display panel 171, respectively. A source portion is formed on the data side printed circuit board 176 in order to receive the image signals from an information process device (not shown) such as a computer, etc. and then to provide the gate driving signal for the gate line of the liquid crystal display panel 610. A gate portion is then formed on the gate side printed circuit board 175 to provide the gate driving signal to the gate lines of the liquid crystal display panel 171. That is, the data side printed circuit board 176 and the gate side printed circuit board 175 generate and apply the gate driving signal and the data signal for driving the liquid crystal display device and a plurality of timing signals for applying the gate driving signal and the data signal to the gate lines and the data lines of the liquid crystal display panel 171, so as to provide the gate driving signal through the gate side tape carrier package 174 to the gate lines of the liquid crystal display panel 171 and to supply the data signal through the data side tape carrier package 178 to the data lines of the liquid crystal display panel 171.

The backlight assembly 150 is provided under the display unit 170 to uniformly supply the light to the display unit 170. The backlight assembly 150 includes lamp units 161 and 162, which are disposed at both ends of a liquid crystal display module 130, for generating the light, a light guide plate 152 for guiding the light emitted by the lamp units 161 and 162 toward the display unit 170 with changing a pathway of the light, a plurality of optical sheets 153 for making a brightness of the light which is transmitted from the light guide plate 152 uniformly and a light reflecting plate 154, which is provided under the light guide plate 152, for reflecting a leaked light to the light guide plate 152 so as to improve the efficiency of the light.

The display unit 171 and the backlight assembly 150 are received in a mold frame 132 used as a receiving container, in order. The mold frame 132 is provided with a top chassis 140, which is faced and combined to the mold frame 132, for preventing the display unit 171 from departing from the mold frame 132.

Meanwhile, the liquid crystal display device further includes a power supply printed circuit board 135, which has an inverter circuit, for supplying the power source to the lamps of the lamp units 161 and 162 and a signal conversion printed circuit board 134 for converting and providing outer data signals to the printed circuit board 176 for data.

The power supply printed circuit board 135 and the signal conversion printed circuit board 134 are fixed to a rear surface of the bottom chassis 131 by means of a bracket 133, as shown in FIGS. 1 and 2. Particularly, when the top chassis 140 is assembled with the mold frame 132 to make the liquid crystal display module 130, the liquid crystal display module 130 is received in the front case 110. The power supply printed circuit board 135 and the signal conversion printed circuit board 134 are combined to the rear surface of the bracket 133 by means of the screws 134*c*, 134*d* and 135*b* so that supports 134*a*, 134*b* and 135*a* are disposed between the rear surface of the bracket 133 and the power supply printed circuit board 135 and the signal conversion printed circuit board 134. The bracket 133 is combined with the front case 110 by means of screws 133*a* and 133*b*.

Then, a shield case 136 is disposed at the rear surface of the bracket 133 to enclose the power supply printed circuit board 135 and the signal conversion printed circuit board 134. The shield case 136 insulates an electromagnetic wave generated from the liquid crystal display module 130 including the power supply printed circuit board 135 and the signal conversion printed circuit board 134.

As described above, when the bracket 133 and the shield case 136 are combined to the rear surface of the liquid crystal display module 130, the rear case 120 is coupled with the front case 110 to complete the liquid crystal monitor device.

As shown in FIG. 2, the power supply printed circuit board 135 and the signal conversion printed circuit board 134 are mounted on the rear surface of the liquid crystal display module 130 by the combination with the bracket 133 having a predetermined height. Further, the shield case 136 is coupled to the rear surface of the bracket 133 by means of the screws 136*a* and 136*b*.

In the liquid crystal display device, there are many problems as follows.

Firstly, the thickness of the liquid crystal display device increases to the extent of the heights of the bracket 133 and the shield case 136 and the heights of the supports 134*a*, 134*b* and 135*a* for fixing the power-supplying printed circuit board 135 and the signal-converting printed circuit board 134 to the bracket 133.

Secondly, since the bracket 133 made of metal material and the screws are used for mounting the power supply printed circuit board 135 and the signal conversion 134 on the liquid crystal display module 130, the liquid crystal display device can be too heavy.

Thirdly, the power supply printed circuit board 135, the signal conversion printed circuit board 134, the bracket 133 and the shield case 136 are respectively integrated with the liquid crystal display module 130 by means of the screws. Accordingly, the assembling processes of the liquid crystal display device can be complicated.

Fourthly, as a plurality of parts is required for integrating the power supply printed circuit board 135, the signal conversion printed circuit board 134, the bracket 133 and shield case 136 with the liquid crystal display module 130, a cost of manufacturing the liquid crystal display device can be increased.

Fifthly, since the power supply printed circuit board 135 and the signal conversion printed circuit board 134 are placed at a position far away from the lamp units 161 and 162 and the data side printed circuit board 176, as not shown in detail in drawings, there is a problem in that a line for supplying the power source and a line for transferring the signals are longer. Furthermore, when the line for supplying the power source and the line for transferring the signals are longer, it is difficult to stably contain and fix the lines to the liquid crystal display module 130.

SUMMARY OF THE INVENTION

The present invention has been made to solve the aforementioned problem, and accordingly it is the object of the present invention to provide a liquid crystal display device of which a total size can be minimized.

It is another object of the present invention to provide a liquid crystal display device capable of improving an assembly capability thereof.

It is still another object of the present invention to provide a liquid crystal display device of which a weight can be minimized.

It is still another object of the present invention to provide a liquid crystal display device in which a power supply line for supplying a power source to lamps can be stably mounted.

It is still another object of the present invention to provide a liquid crystal display device capable of minimizing an electromagnetic wave from the elements therein.

It is still another object of the present invention to provide a liquid crystal display device in which a printed circuit board can be stably mounted.

It is still another object of the present invention to provide a method for assembling a liquid crystal display device, capable of improving an assembly capability of the liquid crystal display device.

Referring to an aspect of the present invention, to achieve the objects of the present invention, a liquid crystal display device according to the present invention includes a light generating unit for generating light, a receiving container for receiving the light generating unit, a power supply section for supplying a power source to the light generating unit, which is mounted on a rear surface of the receiving container, power supply lines for supplying the power source to the light generating unit, which is connected between the light generating unit and the power supply section. In the receiving container, a fixing member is formed for fixing the power supply lines to the power supply section while preventing the power supply lines from being departed from the receiving container. Accordingly, the power supply lines can be connected in shortest course to the power supply section mounted on the rear surface of the receiving container. Furthermore, the movement of the power supply lines can be restricted during an assembly of the liquid crystal display device.

The light generating unit is a cold cathode type of a fluorescent lamp. In the receiving container consisting of a bottom chassis and a mold frame, the fixing member is formed on the mold frame between the power supply section and the light generating unit.

One of a plurality of projections which are formed and spaced apart from one another at a predetermined distance on the rear surface of the receiving container, guide grooves which are formed on the rear surface of the receiving container, and an adhesive tape is used as the fixing member. Among these, the projections easily can fix the power supply lines as the power supply lines are inserted between the projections spaced apart from one another while it is easy to insert and release the power supply lines into/from the projections. Therefore, another member is not required to fix the power supply lines to the receiving container.

To achieve the objects of the present invention, a liquid crystal display device according to the present invention includes a displaying section for displaying an image, a receiving container for receiving the displaying section, a printed circuit board installed on a back surface of the receiving container, for controlling an operation of the displaying section, and a section for shielding an electromagnetic wave from the displaying section and the printed circuit board, which is mounted on the rear surface of the receiving container.

The liquid crystal display device further comprises a connecting cable for connecting the displaying section to the printed circuit board. The printed circuit board includes at least one of a power supplying section mounted on the rear surface of the receiving container, for supplying a power source to the displaying section, and a signal converting section installed on the rear surface of the receiving container, for converting signals supplied to the displaying section. The power supplying section and/or the signal converting section are electrically connected to the displaying section by means of the connecting cable.

Hereinafter, the power supplying section and the signal converting section are respectively referred to as the printed circuit board. In the present Invention, an example of the power supplying section is an inverter for supplying the power source to and operating the light generating unit. Also, an example of the signal converting section is an analog to digital converter (A/D converter) for converting analog signals into digital signals.

The shielding section has a connection opening formed in a sidewall at an end thereof, through which lines for supplying the power source to the power supplying section and lines for providing data signals to the signal converting section are respectively connected to the power electricity supply section and the signal converting section.

The connection opening has a closed shape in the connected part of the connection opening, in order to improve a shield efficiency of the shielding section for shielding the electromagnetic wave. The shielding section has a plurality of through-holes formed at a position corresponding to a predetermined portion of the power supplying section in order to discharge heat from the power supplying section to gain an excellent display quality. In the case that the power supplying section is the inverter for operating the light generating unit of the displaying section, the plurality of through-holes is formed to face to a transformer of the electricity supplying section.

To achieve the objects of the present invention, a liquid crystal display device according to the present invention comprises a displaying section for displaying an image, a receiving container for receiving the displaying section, a power supplying section for supplying a power source to and operating the display section, a signal converting section for converting a signal provided to the displaying section, a fixing section for fixing the power supplying section and the signal converting section to the receiving container.

The power supplying section and the signal converting section are fixed to a rear surface of the receiving container to be placed between the displaying section and the fixing section and have regions overlapped with the fixing section to minimize a thickness of the liquid crystal display device.

Preferably, one end of the fixing section is combined with the power supplying section and/or the signal converting section and the other end of the fixing section is combined with the rear surface of the receiving container. Here, the fixing section includes a first bracket of which one end is combined with the power supplying section and the other end is combined with the rear surface of the receiving container and a second bracket of which one end is fixed to the signal converting section and the other end is fixed to the rear surface of the receiving container. Furthermore, since the fixing section has a lower height than the highest one of circuit elements constructing the power supplying section and the signal converting section, the liquid crystal display device can be manufactured smaller and thinner. The present invention accomplishes the object in that the liquid crystal display device can be made small, thin and light as the power supplying section and the signal converting section is placed at a lower position than a top end of the receiving container.

The receiving container has a bottom chassis that receives the displaying section and has first and second locking holes formed at a bottom surface and a mold frame that receives the bottom chassis. On the other hand, the fixing section has a first bracket of which one end is connected to the power supplying section and the other end has a third locking hole formed therein to correspond to the first locking hole and a second bracket of which one end is connected to the signal converting section and the other end has a fourth locking hole formed therein to correspond to the second locking hole. The first and second brackets are fixed to the rear surface of the bottom chassis by means of a first screw extending through the third and first locking holes in order and a second screw extending through the fourth and second locking holes in order. Thereby, the liquid crystal display device can be rigidly and easily assembled.

To achieve the objects of the present invention, a liquid crystal display device according to the present invention includes a receiving container for receiving an image displaying section, which has at least one of a first locking hole formed on a bottom surface thereof, a power supplying section for supplying a power source to the displaying section, which is mounted on a rear surface of the receiving container, a signal converting section for converting a signal provided to the displaying section, which is mounted on the rear surface of the receiving container, a fixing section, which is combined with the power supplying section and the signal converting section and has at least one second locking hole formed therein and a shielding section for shielding an electromagnetic wave from the power supplying section, the signal converting section and the displaying section, which is mounted on the rear surface of the receiving container and has at least one third locking hole formed thereon.

The shielding section, the power supplying section and the signal converting section are fixed to the receiving container in such a manner as the screws respectively extend through and are combined with the corresponding one of the first, second and third locking holes from an outside of the shielding section to the displaying section. Accordingly, the liquid crystal display device can be rigidly and easily assembled.

To achieve the objects of the present invention, a liquid crystal display device according to the present invention has a displaying section for displaying an image, a receiving container for receiving the displaying section, which has a guide groove formed thereon and a shielding section for shielding an electromagnetic wave, which is combined to a rear surface of the receiving container. The shielding section is combined with the receiving container in such a manner as the shielding section slides along the guide groove from one end to the other end of the rear surface of the receiving container.

The receiving container has a bottom chassis for receiving the displaying section and a mold frame for receiving the bottom chassis. At least one projection is formed on the bottom chassis and the mold frame in order to prevent the shielding section, which is guided to a position to be combined with the receiving container, from departing from the rear surface of the receiving container. At least one stopper also is formed on the mold frame in order to stop the sliding of the shielding section at a position that the shielding section is combined with the receiving container.

To achieve the objects of the present invention, a liquid crystal display device according to the present invention includes a lamp unit for generating a light, a liquid crystal display panel for displaying an image in response to the light, a panel-driving printed circuit board for controlling an operation of the liquid crystal display panel, which is connected by means of a tape carrier package with the liquid crystal display panel, a receiving container for receiving the lamp unit and the liquid crystal display panel, which has a space formed at a predetermined depth on one end of a rear surface thereof to receive the printed circuit board, for controlling the operation of the liquid crystal display panel and a shielding section for shielding an electromagnetic wave, which is combined to the rear surface of the receiving container. A projection is formed on the rear surface of the receiving container in order to prevent the panel-driving printed circuit board, which is received in the space of the receiving container, from departing from the rear surface of the receiving container.

The shielding section has a first support formed on an upper surface of one end corresponding to the panel-driving printed circuit board to be depressed in a direction to the panel-driving printed circuit board, in order to prevent the shielding section from electrically contacting with the panel-driving printed circuit board and the receiving container has a second support formed on the receiving container in order to prevent the panel-driving printed circuit board from electrically contacting with the shielding section in such a manner of contacting the first support.

To achieve the objects of the present invention, a liquid crystal display device according to the present invention includes a lamp unit for generating a light, a liquid crystal display panel for displaying an image in response to the light and a receiving container for receiving the lamp unit and the liquid crystal display panel. A plurality of supporting members is formed on a rear surface of the receiving container to prevent the receiving container from being inclined when the lamp unit is combined with the receiving container.

The plurality of the supporting members is projected at a predetermined height on four corners of the rear surface of the receiving container. Meanwhile, a power supplying section and/or a signal converting section are placed at a lower position than a top end of the supporting members in order to make the liquid crystal display device thin.

Referring to the other aspect of the present invention, in a method for assembling a liquid crystal display device according to the present invention to achieve the objects of the present invention, there are firstly prepared a displaying section for displaying an image, a receiving container for receiving the displaying section, which has at least one first locking hole formed on a bottom surface thereof and a printed circuit board for controlling an operation of the displaying section, on which a fixing member having at least one second locking hole is combined therewith. Next, the printed circuit board having the fixing member and a shielding section for shielding an electromagnetic wave discharged from the printed circuit board and the displaying section, which has at least one third locking hole formed therein, are installed on a rear surface of the receiving container. Then the shielding section and the printed circuit board are fixed to the receiving container in such a manner as at least one screws respectively extend through and are combined with the corresponding one of the first, second and third locking holes from an outside of the shielding section to the displaying section.

In the liquid crystal display device and the method for assembling the same according to the present invention, the inverter board and the A/D board makes close contact with and are combined with the rear surface of the bottom chassis. Furthermore, the brackets used for fixing the A/D board and the inverter board can be constructed to have an area enough to form the locking hole therein in which the screw is inserted and locked. In addition, the shield case, the inverter board, the panel-driving printed circuit board, the A/D board and the like have the locking holes as the locking structure at a position corresponding to one another, so as to be combined with the bottom chassis by means of the screws extending through them from the outside of the shield case.

Accordingly, brackets having such a size as large as the liquid crystal display panel in order to fix the A/D board and the inverter board to the receiving container are unnecessary. As a result, the thickness and the weight of the liquid crystal display device can be reduced and the assembly capability of the liquid crystal display device can be improved.

In the monitor device having a construction as described above, the receiving container for receiving the displaying section and the printed circuit board for operating the displaying section can be mounted on the displaying section to face the rear surface of the displaying section and they are placed at a lower position than the top end of the receiving container. The thin and light-monitor device can be made as the front case defining a validity screen area and the rear case facing the front case are assembled so that the thin and light liquid crystal display device is placed between the front case and the rear case.

BRIEF DESCRIPTION OF THE DRAWINGS

The above and other objects and advantages of the present invention will become readily apparent by reference to the following detailed description when considered in conjunction with the accompanying drawings wherein.

DETAILED DESCRIPTION OF THE PREFERRED EMBODIMENT

Hereinafter, a liquid crystal display device according to the preferred embodiment of the present invention will be described in detail with reference to the accompanying drawings.

Figure 1:
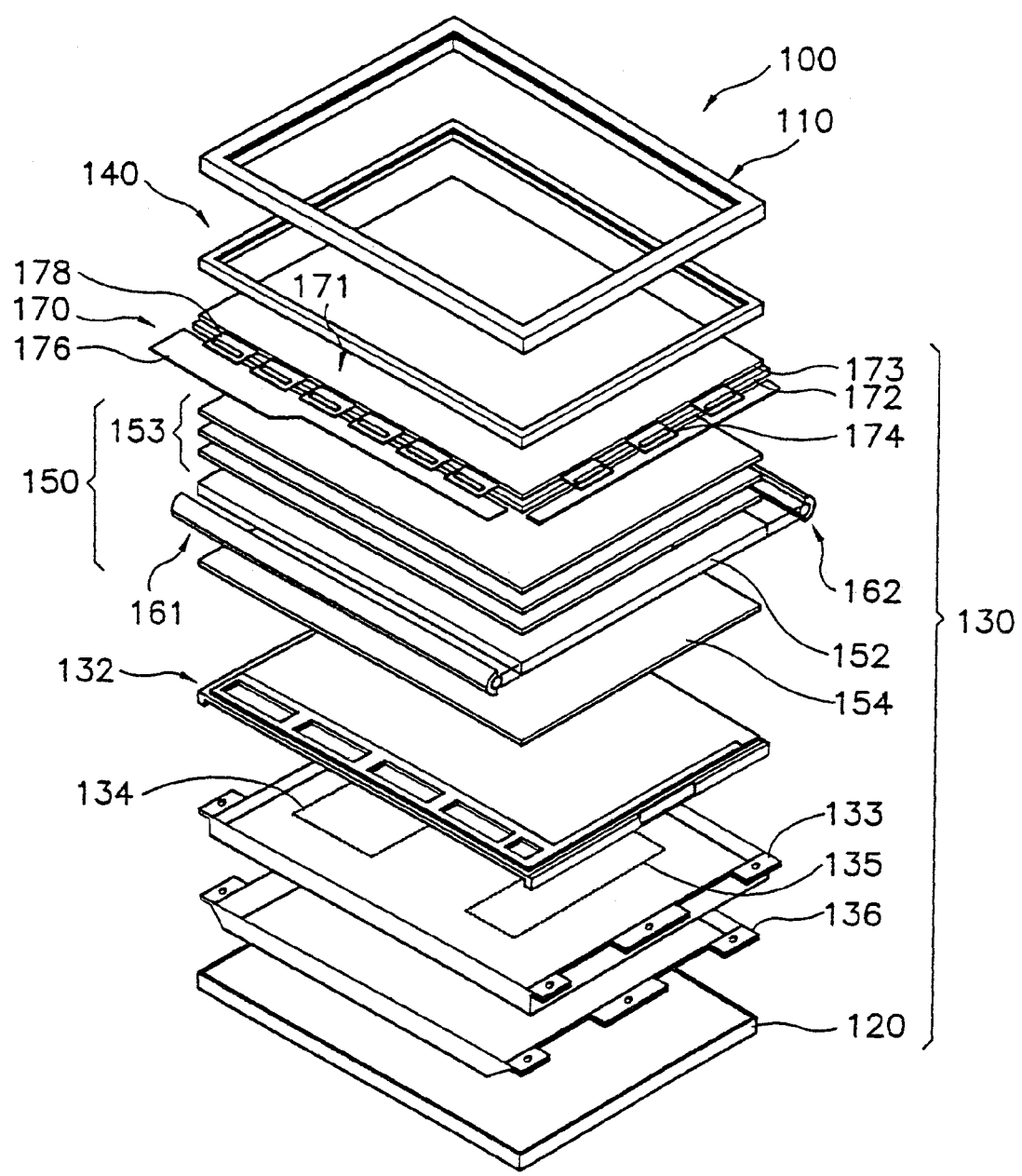
FIG. 1 is an exploded perspective view schematically showing a conventional liquid crystal display device.
Figure 2:
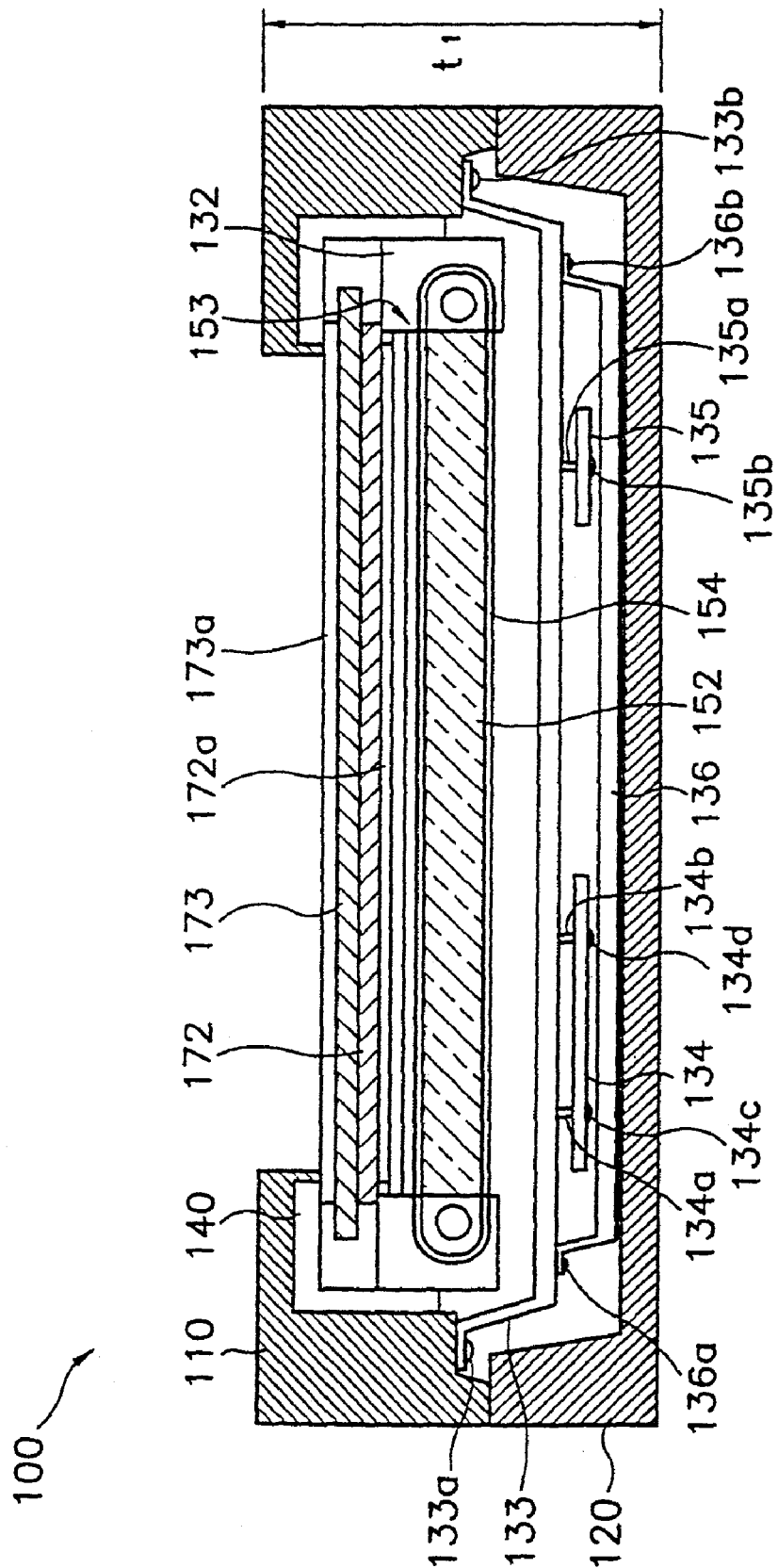
FIG. 2 is a sectional view showing a combination construction of the liquid crystal display device shown in FIG. 1.
Figure 3:
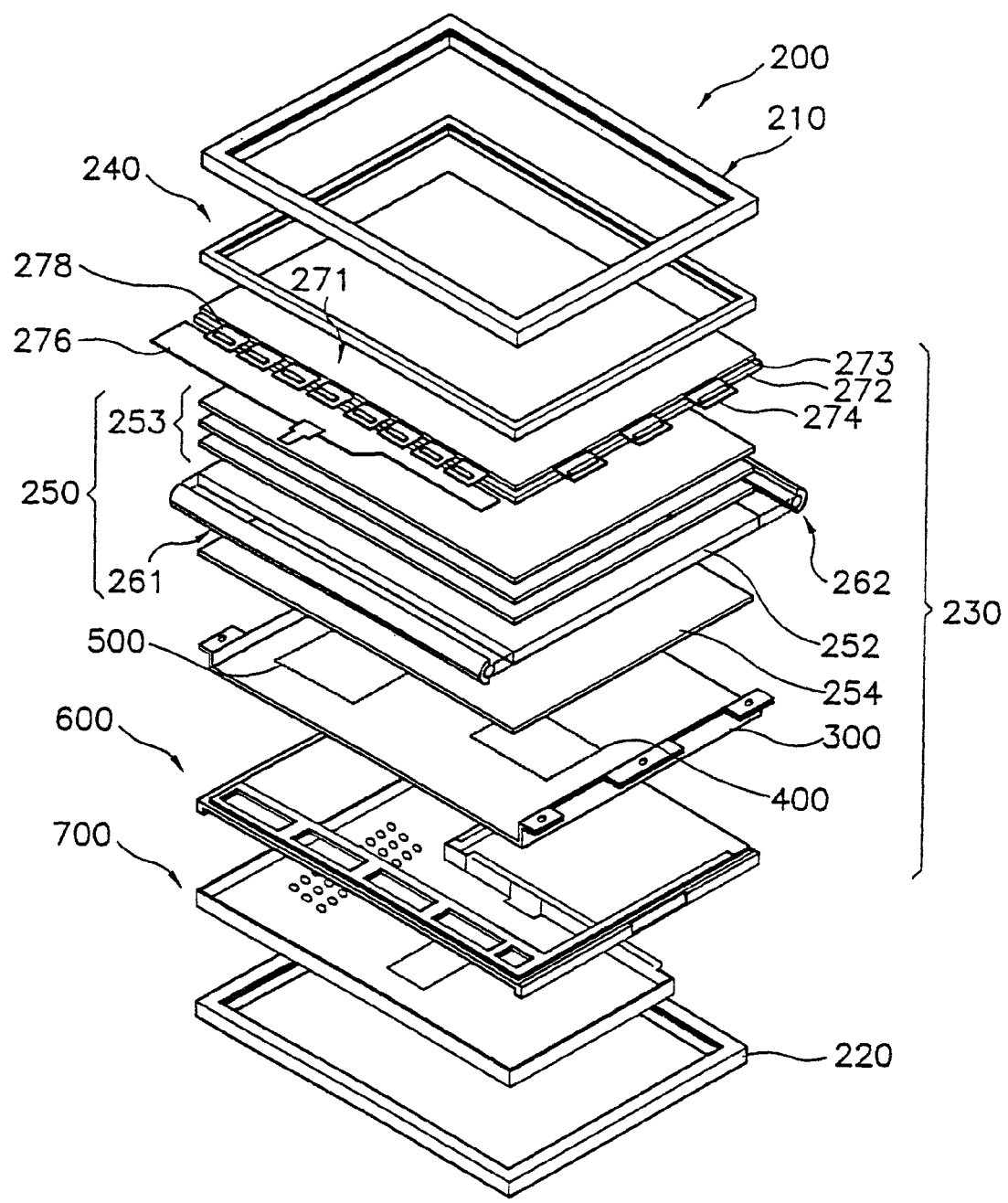
FIG. 3 is an exploded perspective view showing a liquid crystal display device according to a preferred embodiment of the present invention.

FIG. 3 is an exploded perspective view schematically showing a liquid crystal display device according to the preferred embodiment of the present invention.

Referring to FIG. 3, the liquid crystal display device 200 includes a liquid crystal display module 230 for displaying an image when an image signal is applied thereto and a case that has front and rear cases 210 and 220, for receiving the liquid crystal display module 230.

The liquid crystal display module 230 can be generally and functionally divided into a section for displaying the image, a receiving container for receiving the displaying section and a section for controlling an operation of the displaying section.

Particularly, the displaying section has a display unit 270 including a liquid crystal display panel and a backlight assembly 250 for supplying a light to the display unit 270. The receiving container has a bottom chassis 300 for receiving the display unit 270 and the backlight assembly 250 and a mold frame 600 for receiving and supporting the bottom chassis 300, of which a bottom surface is opened to expose a rear surface of the bottom chassis 300.

Furthermore, the section for controlling the operation of the display section has a printed circuit board 500 (hereinafter, referred to as an inverter board) for supplying the power source to the displaying section and a printed circuit board 400 (hereinafter, referred to as an A/D board) for converting a signal provided to the displaying section. A shield case 700 is disposed between the receiving container and the rear case 220 to shield an electromagnetic wave discharged from the inverter board 500 and the A/D board 400.

Hereinafter, a construction of the liquid crystal display device as described above will be explained in detail.

The display unit 270 has the liquid crystal display panel 271, a panel-driving printed circuit board 276 (hereinafter, referred to as an integrated PCB) for operating the liquid crystal display panel 271, a data side tape carrier package 278 and a gate side tape carrier package 270.

The liquid crystal display panel 271 comprises a thin film transistor board 272, a color filter board 273 and a liquid crystal (not shown).

The thin film transistor board 272 is a transparent glass substrate on which thin film transistors in a matrix shape are formed. A data line is connected with source terminals of the thin film transistors and a gate line is connected with gate terminals of the thin film transistors. Furthermore, pixel electrodes made of ITO, which is a transparent and conductive material, are formed at drain terminals of the thin film transistors.

When electric signals are applied to the data line and the gate line, the electric signals are inputted into the source terminals and the gate terminals of the respective thin film transistor. As the electric signals are inputted into the thin film transistors, the thin film transistors are respectively turned-on or turned-off, resulting in outputting the electric signals, which are required to form pixels, to the drain terminals.

The color filter board 273 is provided to face to the thin film transistor board 272. The color filter board 273 has RGB pixels, which are formed by a thin film process to give desired colors while the light passes through the color filter board 273. A surface of the color filter board 273 is coated with common electrodes made of the ITO.

When the power source is applied to the gate and source terminals of the transistors on the thin film transistor board 272 to turn on the thin film transistors, an electric field is created between the pixel electrodes and common electrodes of the color filter board 273. This electric field changes an array angle of the liquid crystal injected between the thin film transistor board 272 and the color filter board 273, resulting in that a light transmissivity depending on the changed array angle also is changed so as to give desired pixels.

A driving signal and a timing signal are applied to the gate line and the data line of the thin film transistors in order to control the array angle of the liquid crystal and the time at which the liquid crystal is arranged in the liquid crystal display panel 271.

As shown in FIG. 3, the data side tape carrier package 278, which is one of the flexible circuit boards, is attached to the source portion of the liquid crystal display panel 271 to decide a time at which a data driving signal is applied to the liquid crystal display panel 271. On the other hand, the gate tape carrier package 274 is attached to the gate portion of the liquid crystal display panel 271 to decide a time at which a gate driving signal is applied to the liquid crystal display panel 271.

The integrated printed circuit board 276, which applies the driving signal to the gate line and the data line as soon as receiving image signals input from outside of the liquid crystal display panel 271, makes contact with the data side tape carrier package 278 for the data line in the liquid crystal display panel 212.

A source portion and a gate portion are formed on the integrated printed circuit board 278. The source portion receives the image signals from an information processing device (not shown) such as a computer, etc. and then provides the data driving signal for the data line of the liquid crystal display panel 271. The gate portion provides the gate driving signal for the gate line of the liquid crystal display panel 271.

That is, the integrated printed circuit board 276 generates the gate driving signal and the data signal for driving the liquid crystal display device and the plural timing signals for applying the gate driving signal and the data signal in an acceptable time, so as to apply the gate driving signal through the gate side tape carrier package 274 to the gate line of the liquid crystal display panel 271 and the data signal through the data side tape carrier package 278 to the data line of the liquid crystal display panel 271. However, it can be noted that each printed circuit board can be respectively substituted for the source portion and the gate portion formed on the integrated printed circuit board 276. On the other hand, it is also noted that a printed circuit board is substituted for the gate portion of the integrated printed circuit board 276 to be connected to the gate side tape carrier package 274 and only the source portion can be formed in the integrated printed circuit board 276 to be connected to the data side tape carrier package 278 as shown in FIG. 3.

A backlight assembly 250 is disposed under the display unit 270 to supply the light to the display unit 270 uniformly. The backlight assembly 250 includes first and second lamp units 261 and 262 for generating the light. The first and second lamp units 261 and 262 respectively have two lamps, which are cold cathode fluorescent lamps.

A light guide plate 252 has a size corresponding to that of the liquid crystal display panel 271 of the display unit 270 and is disposed under the liquid crystal display panel 271 so as to guide the light generated from the first and second lamp units 261 and 262 to the display unit 270 while changing the pathway of the light.

Meanwhile, a plurality of optical sheets 253 is disposed on the light guide plate 252 to make uniformly a brightness of the light transmitted from the light guide plate 252 to the liquid crystal display panel 271. Furthermore, a reflection plate 254 is provided under the light guide plate 252 in order to reflect the light leaked from the light guide plate 252 to the light guide plate 252, resulting in increasing the light efficiency.

The display unit 270 and the backlight assembly 250 are received in a bottom chassis 300 used as a receiving container, which is fixedly supported by means of a mold frame 600. The mold frame 600 has an opening at a bottom surface in order to expose the rear surface of the bottom chassis 300. Furthermore, an area of the mold frame 600 in which the integrated printed circuit board 276 is mounted in a bending state partially opens so that the mold frame 600 can receive elements installed on the integrated printed circuit board 276.

The printed circuit board 500 (hereinafter, referred to as an inverter board) for supplying the power source and the printed circuit board 400 (hereinafter, referred to as an A/D board) for converting signals are mounted on the rear surface of the bottom chassis 300 which is exposed through the opening in the bottom surface of the mold frame 600. The inverter board 500 transforms the power source at a predetermined voltage level before providing the power source to the first and second lamp units 261 and 262. The A/D board 400 is connected to the integrated printed circuit board 276 to convert an analog type of the data signals into a digital type of the data signals before supplying the data signals to the liquid crystal display panel 271. The A/D board 400 and the inverter board 500 are fixed to the bottom chassis 300 by means of a fixing member, for example brackets. Relating to the fixture of the A/D board 400 and the inverter board 500, it will be described below.

Meanwhile, a top chassis 240 is disposed on the display unit 270 to prevent the display unit 270 from departing from the bottom chassis 300 while it causes to bend the integrated printed circuit board 276 to outside of the mold frame 600.

Figure 4:
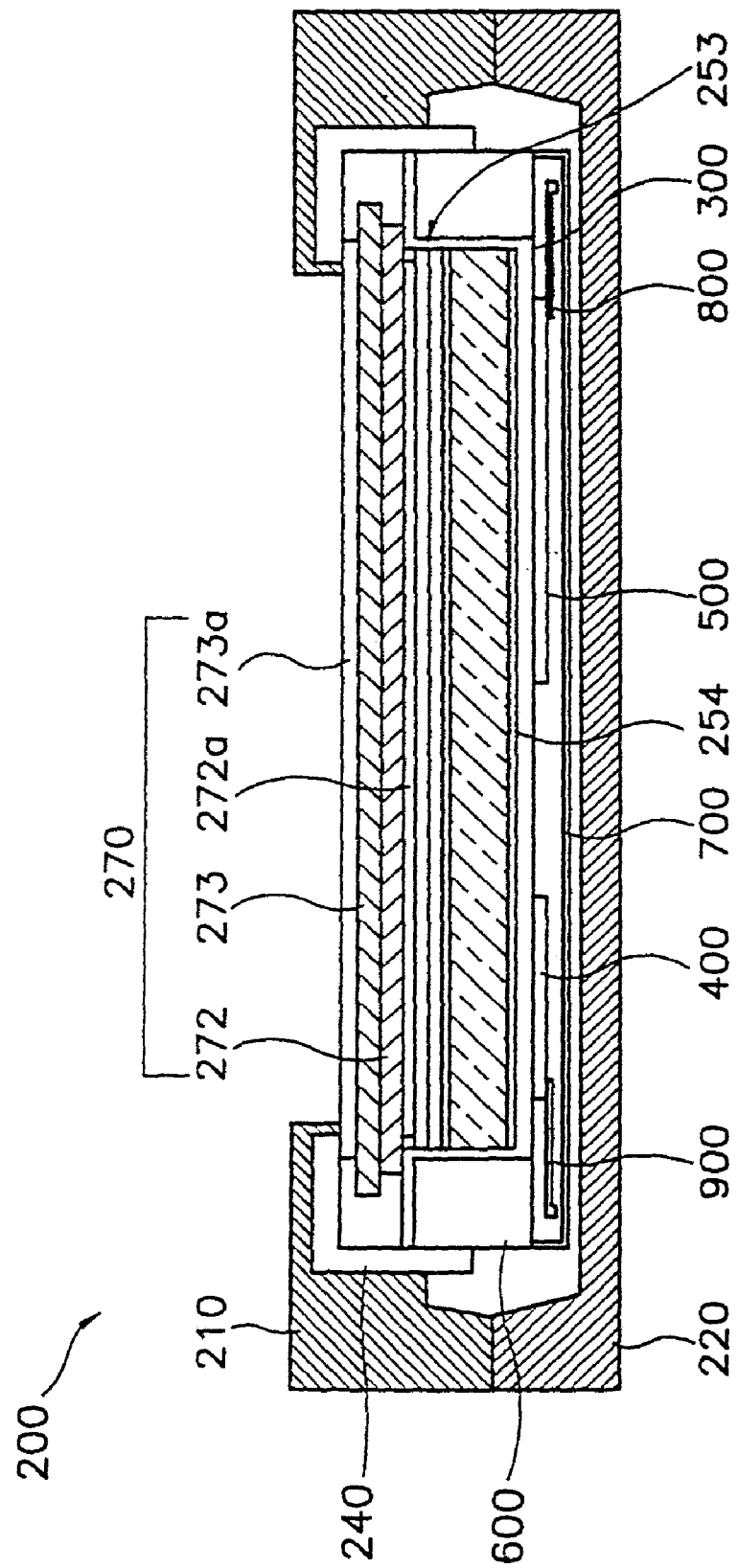
FIG. 4 is a sectional view showing a combination construction of the liquid crystal display device shown in FIG. 3.

FIG. 4 is a view of showing a combination construction of the liquid crystal monitor device as shown in FIG. 3.

Referring to FIG. 4, the reflection plate 254, the light guide plate 252, the optical sheet 253 and the display unit 270 are sequentially received in the bottom chassis 300 disposed in the mold frame 600. The A/D board 400 and the inverter board 500 are fixed on the rear surface of the bottom chassis 300 in a manner where screws (not shown) extend through the A/D board 400, the inverter board 500 and the first and second brackets 800 and 900 and are combined to the bottom chassis 300.

A shield case 700 is combined to the rear surface of the mold frame 600 to shield an electromagnetic wave discharged from the A/D board 400, the inverter board 500, the display unit 270 and the like as enclosing the A/D board 400 and the inverter board 500. The display unit 270 is fixed by means of the top chassis 240 and the front case 210 and the rear case 220 are respectively combined to the top chassis 240 and the shield case 700, thereby completing the assembly of the liquid crystal display device.

Figure 5:
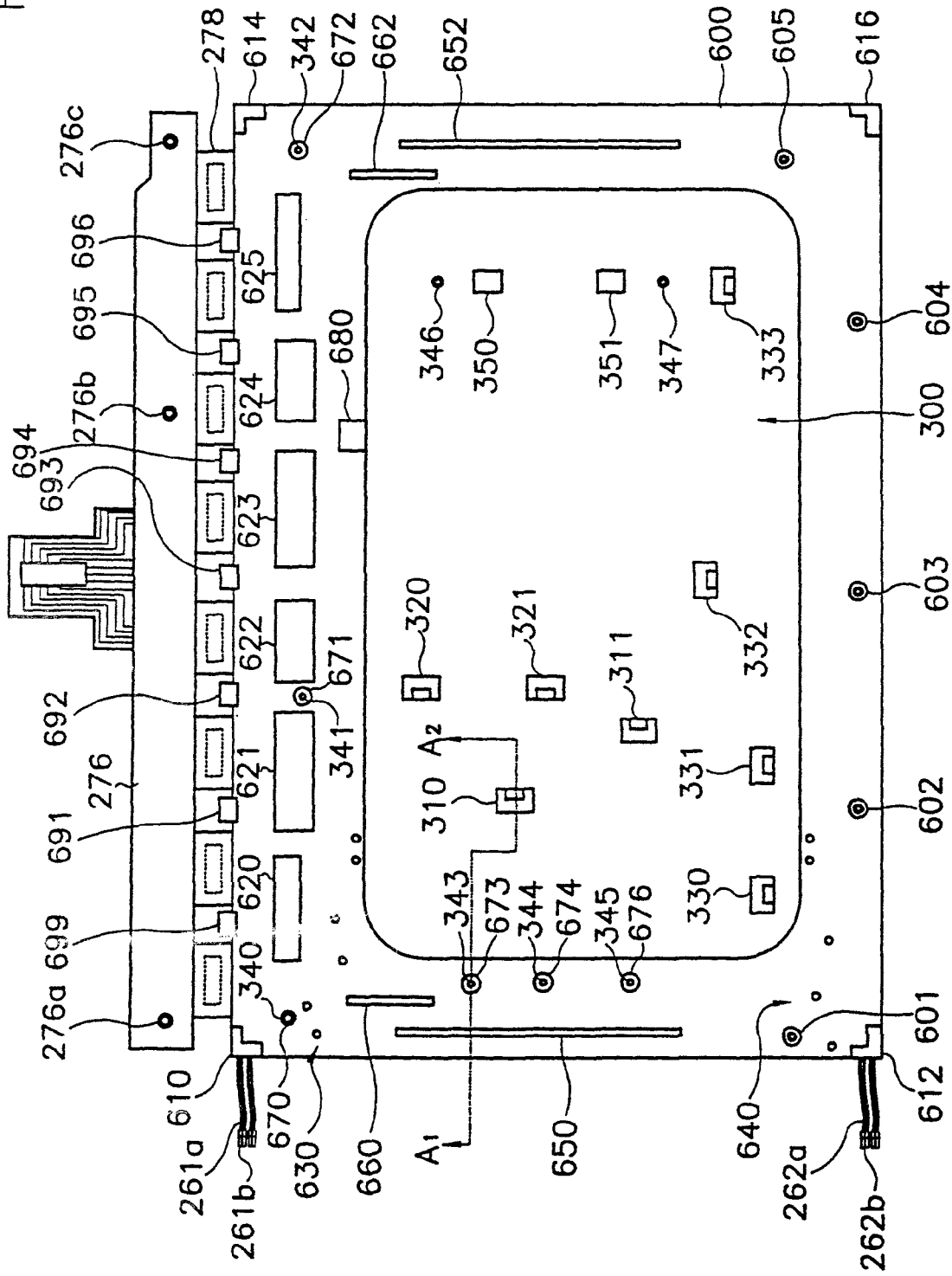
FIG. 5 is a view showing a construction of a rear surface of the liquid crystal display device shown in FIG. 4.
Figure 6:
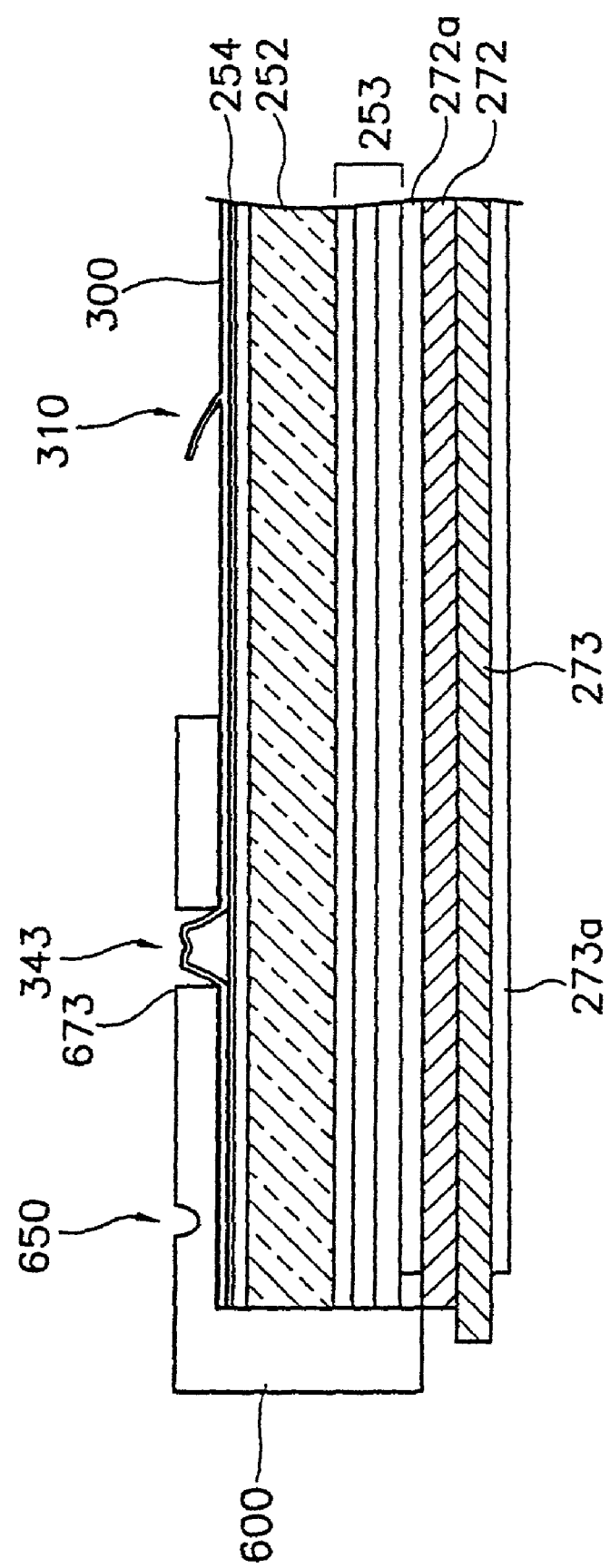
FIG. 6 is a view showing a sectional construction of the liquid crystal display shown in FIG. 5.

FIG. 5 is a view showing the constructions of the rear surface of the bottom chassis 300 and the mold frame 600 in the liquid crystal display device as shown in FIG. 4 and FIG. 6 is a sectional view showing the constructions of the bottom chassis 300 and the mold frame 600, taken along the line A1-A1 in FIG. 5.

Referring to FIG. 5, the mold frame 600 has a plurality of holes 620, 621, 622, 623, 624 and 625 along edges of the rear surface thereof in order to receive the circuit elements mounted on the integrated printed circuit board 276. In addition, the mold frame 600 has an opening at the center portion of the bottom surface thereof so that the rear surface of the bottom chassis 300 is exposed. The reason for forming the opening in the bottom surface of the mold frame 600 in order to expose the rear surface of the bottom chassis 300 is that the A/D board 400 and the inverter board 500 are faced to and directly fixed to the rear surface of the bottom chassis 300.

If the A/D board 400 and the inverter board 500 are fixed to the bottom chassis 300 through the mold frame 600 without the opening, the A/D board 400 and the inverter board 500 are placed at a position such that the heights thereof increase as much as the thickness of the mold frame 600. Therefore, the thickness of the liquid crystal display device can not be further reduced such that the liquid crystal display device may be made thinner and smaller.

That is, the mold frame 600 is formed with the opening at the bottom surface thereof so that the A/D board 400 and the inverter board 500 is faced to and directly mounted on the rear surface of the bottom chassis 300, resulting in reducing the total thickness of the liquid crystal display device.

Meanwhile, the mold frame 600 has first, second, third and fourth supports 610, 612, 614 and 616 at four corners thereof to prevent the mold frame 600 from declining toward a side during the assembly of the liquid crystal display device. The four supports 610, 612, 614 and 616 prevent the mold frame 600 from declining due to combination forces of the screws (not shown) forced to each corner when the first and second lamp units 261 and 262 are received in the mold frame 600 and fixed with the screws. It is sufficient that the first, second, third and fourth supports 610, 612, 614 and 616 are held at a position equal to or higher than the A/D board 400 and the inverter board 500 mounted on the bottom chassis 300.

Furthermore, first and second guide grooves 650 and 652 are formed at both ends of the mold frame 600 to slidably guide the shield case 700 to a mounting position. First and second stoppers 660 and 662 are formed in the first and second guide grooves 650 and 652 in order to stop the shield case 700 sliding in the first and second guide grooves 650 and 652 at the mounting position of the mold frame 600. The shield case 700 moves at the mounting position as sliding along the first and second guide grooves 650 and 652 and is stopped by means of the first and second stoppers 660 and 662. Accordingly, it is easy to assemble the shield case 700 with the mold frame 600.

On the other hand, a plurality of first guide projections 630 is formed at an end of the mold frame 600 in order to fix a first power supplying line 261a, which supplies the power source to the lamp of the first lamp unit 261, to the rear surface of the mold frame 600. Also, a plurality of second guide projections 640 is formed on the mold frame 600 in order to fix a second power supplying line 262, which supplies the power source to the lamp of the second lamp unit 252.

First, second, third, fourth, fifth, sixth and seventh supports 690, 691, 692, 693, 694, 695 and 696 are formed at the other end of the mold frame 600, the end at which the integrated printed circuit board 276 is bent, in order to prevent the shield case 700 and the integrated printed circuit board 276 from being electrically contacted.

First and second projections 310 and 311 are formed on the rear surface of the bottom chassis 300 to prevent the inverter board 500 from departing from the bottom chassis 300 before the inverter board 500 is fixed to the bottom chassis 300 by means of the screws. Similarly, third and fourth projections 320 and 321 are formed on the rear surface of the bottom chassis 300 to prevent the A/D board 400 from departing from the bottom chassis 300 before the A/D board 400 is fixed to the bottom chassis 300 by means of the screws. In addition, fifth and sixth projections 350 and 351 are formed on the rear surface of the bottom chassis 300 at a predetermined distance from the third and fourth projections 320 and 321 in order to help the third and fourth projections 320 and 321 to prevent the A/D board 400 from departing from the bottom chassis 300.

Furthermore, sixth, eighth, ninth and tenth projections 330, 331, 332 and 333 are formed on the rear surface of the bottom chassis 300 in order to prevent the shield case 700 from departing from the bottom chassis 300 until the shield case 700 is fixed to the bottom chassis 300 by means of the screws.

First, second, third, fourth, fifth, sixth, seventh and eighth locking holes 340, 341, 342, 343, 344, 345, 346 and 347 are formed on the rear surface of the bottom chassis 300 to combine the integrated printed circuit board 276, the inverter board 500 and the A/D board 400 with the bottom chassis 300 by means of the screws (not shown). The first to sixth locking holes 340, 341, 342, 343, 344 and 345, which are used for fixing the integrated printed circuit board 276 and the inverter board 500, are covered with a skin of the mold frame 600. Accordingly, the mold frame 600 has first, second, third, fourth, fifth and sixth thru-holes 670, 671, 672, 673, 674 and 675 formed at positions thereof corresponding to the first to sixth locking holes 340, 341, 342, 343, 344 and 345 of the bottom chassis 300 in order to expose the first to sixth locking holes 340, 341, 342, 343, 344 and 345 of the bottom chassis 300 to the outside. However, it is possible that the fourth to sixth thru-holes 673, 674 and 675 corresponding to the fourth to sixth locking holes 343, 344 and 345 are removed in the mold frame 600 so that the fourth to sixth locking holes 343, 344 and 345 are completely exposed.

FIG. 6 is a sectional view showing the construction of the locking holes, the thru-holes and the projections as shown in FIG. 5. In FIG. 6, although the fourth locking hole 343, the fourth thru-hole 673 and the first projection 310 are depicted, the construction elements performing the same function has the same shape.

Referring to FIG. 6, the fourth thru-hole 673 is formed at a predetermined size so that the fourth locking hole 343 of the bottom chassis 300 is exposed. As shown in FIG. 6, the fourth locking hole 343 positioned below the fourth thru-hole 673 of the bottom chassis 300 is formed to project through the fourth thru-hole 673. That is, the reflection plate 254 is spaced at a predetermined distance from the top end of the fourth locking hole 343.

Accordingly, even though the screw is short in length, the screw can be easily combined with the fourth locking hole 343 when the inverter board 500 is fixed to the rear surface of the bottom chassis 300 by using the screw. In other words, since the fourth locking hole 343 is upwardly projected on the bottom chassis 300, the combination capability of the inverter board 500 and the bottom chassis 300 can be improved when the inverter board 500 is combined with the bottom chassis 300 by means of the screw and it is possible to prevent the reflection plate 254 from being damaged by the screw.

Meanwhile, the first projection 310 is formed by cutting a part of the bottom chassis 300 and opening it in direction to the fourth locking hole 343 to guide the inverter board 400. That is, when the inverter board 500 is received in the bottom chassis 300 while moving from the fourth locking hole 343 to the first projection 310, the first projection 310 for preventing the inverter board 500 from departing from the bottom chassis 300 allows the locking hole formed in the inverter board 500 to be in correspondence to the fourth locking hole 343.

Figure 7:
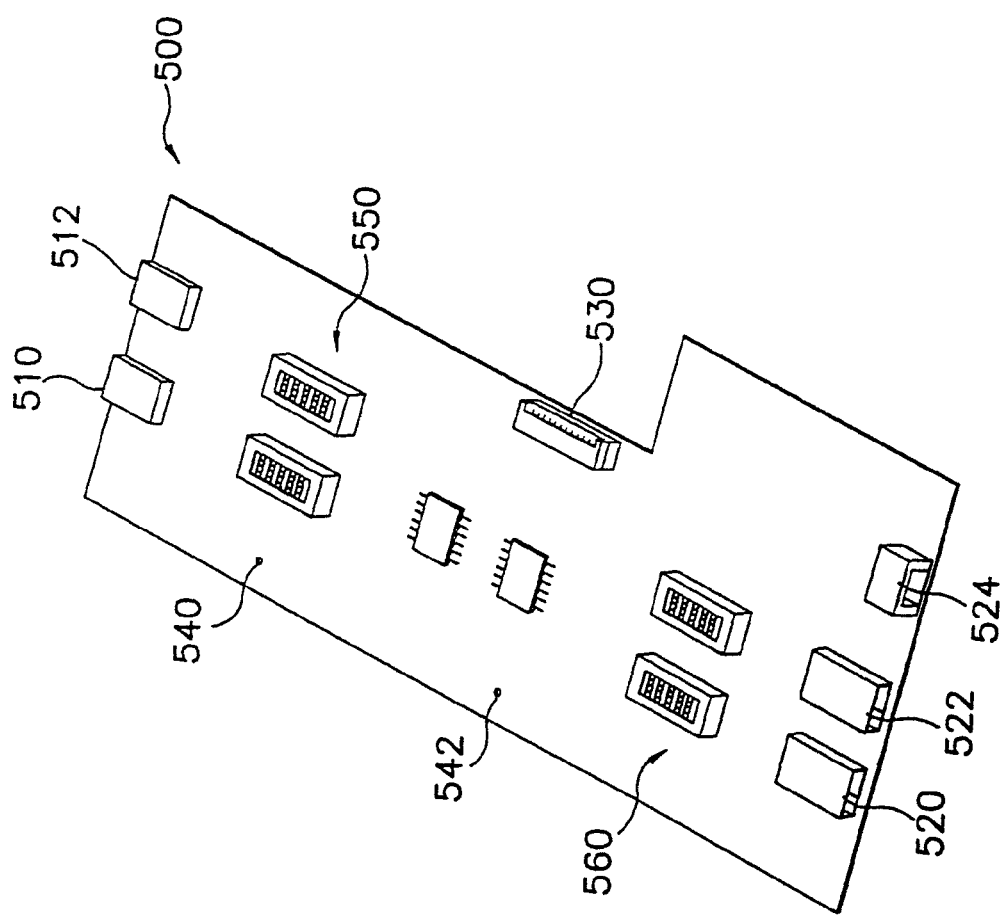
FIGS. 7 to 10 are views showing constructions of an inverter board shown in FIG. 3.
Figure 8:
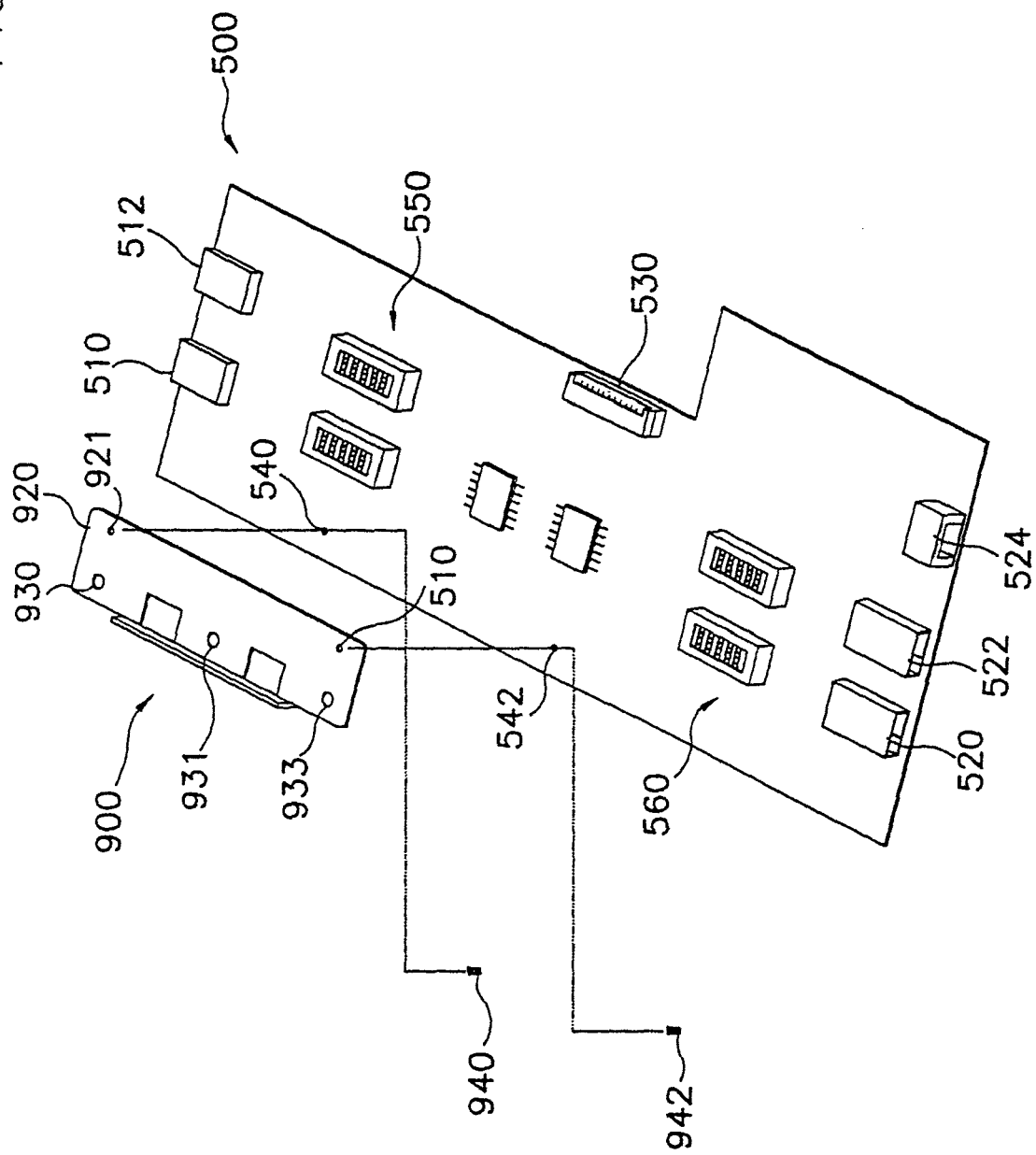

FIG. 7 is a perspective view showing the construction of the inverter board 500 and FIG. 8 is a perspective view showing the second bracket 900 to fix the inverter board 500 shown in FIG. 7 to the bottom chassis 300.

Referring to FIG. 7, a first connector 524 for receiving the power source, transformers 550 and 560 of an inverter circuit for changing the power source input through the first connector 524 into a predetermined voltage level for which the first and second lamp units 261 and 262 require, second to fifth connectors 510, 512, 520 and 522 respectively connected to the connectors 261b and 262b of the first and the second power supply lines 261a and 262a of the first and second lamp units 261 and 262 and the sixth connector 530 for electrically connecting the inverter board 500 to the A/D board 400, are installed on the inverter board 500. Furthermore, the inverter board 500 has first and second engaging holes 540 and 542 formed at an end, which are connected with the second bracket 900.

As shown in FIG. 8, the second bracket 900 includes the combination surface 920 in which third and fourth engaging holes 921 and 922 are formed to be corresponding to the first and second engaging holes 540 and 542 of the inverter board 500 and the grip portion integrally formed to be normal to the combination surface 920. The grip portion allows the worker to handle the inverter board 500 when the inverter board 500 is combined with the second bracket 900. Even though the grip portion is not formed on the second bracket 900, because only one surface forms the second bracket 900, the worker can still facilitate the mounting of the inverter board 500 on the back surface of the bottom chassis 300.

Figure 9:
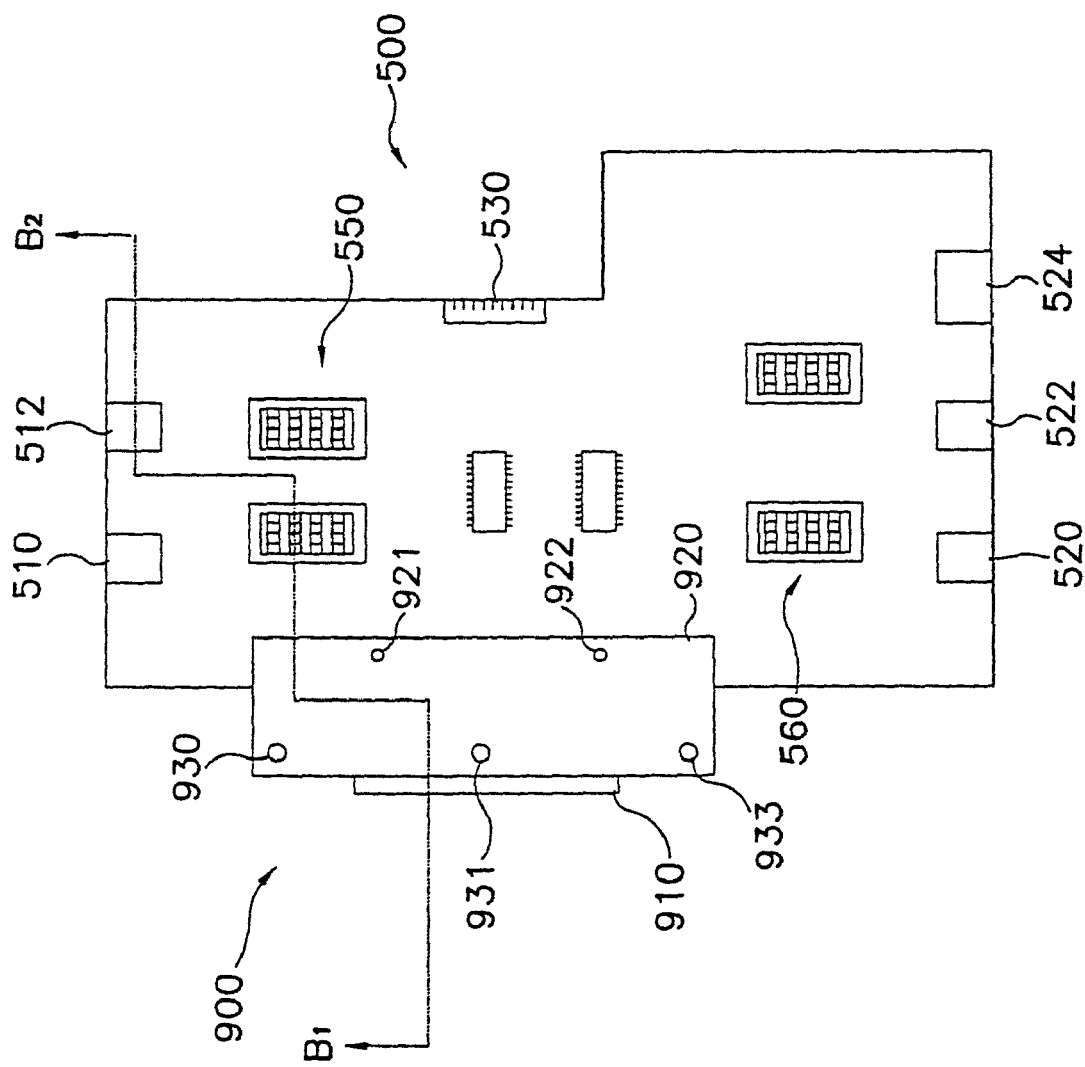

The first and third engaging holes 540 and 921 are respectively connected with the second and fourth engaging holes 542 and 922 by means of the first and second engaging screws 940 and 942. That is, when a surface 920 of the second bracket 900 is partially overlapped with the upper surface of the inverter board 500 so that the first and third engaging holes 540 and 921 face to the second and fourth engaging holes 542 and 922, the first engaging screw 940 extends through the first and third engaging holes 540 and 921 and the second engaging screw 942 through the second and fourth engaging holes 542 and 922 to combine the inverter board 500 with the second bracket 900. As a result, the inverter board 500 is completed as shown in FIG. 9.

Here, the second bracket 900, an area in which the first and second engaging holes 540 and 542 of the inverter board 500 are formed and the first and second engaging screws 940 and 942 perform a connection of the inverter board 500 and an earth terminal.

That is, the area in which the first and second engaging holes 540 and 542 is coated with a conductive pattern (not shown) that is electrically connected with the second bracket 900. The second bracket 900 is combined with the bottom chassis 300 by means of the screw (not shown). Accordingly, the inverter board 500 is earthed through the bottom chassis 300.

On the other hand, the surface 920 of the second bracket 900 has ninth, tenth and eleventh locking holes 930, 931 and 933 corresponding to the fourth to sixth locking holes 343, 344 and 345 formed in the bottom chassis 300.

Figure 10:
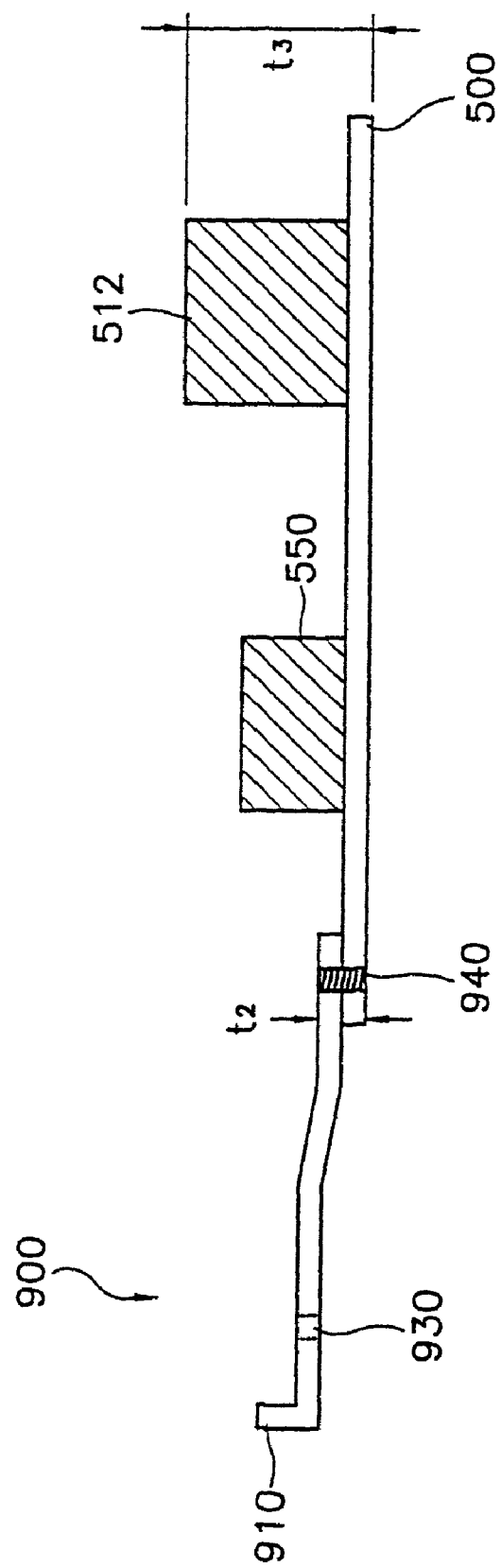

FIG. 10 is a sectional view showing the construction of the inverter board 500 and the second bracket 900, taken along the line B1-B2 shown in FIG. 9.

Referring to FIG. 10, the surface 920 of the second bracket 900 is partially overlapped with the upper surface of the inverter board 500 so that the first and second engaging holes 540 and 542 face to the third and fourth engaging holes 921 and 922.

A thickness, i.e. a height t2, at a portion that the inverter board 500 is overlapped with the second bracket 900 is lower than a height t3 from the rear surface of the inverter board 300 to the upper surface of the third connector 512 which has the largest size in height among the elements mounted on the inverter board 500.

Therefore, when the inverter board 500 is faced and directly installed to the rear surface of the bottom chassis 300, the height of the overlapped portion of the second bracket 900 and the inverter board 500 does not increase over the height of the elements mounted on the inverter board 500 even if the second bracket 900 is used for combining the inverter board 500 and the bottom chassis 300. In other words, even though the inverter board 500 is faced to and directly combined with the bottom chassis 300 by using the second bracket 900, the thickness of the liquid crystal display device does not increase at all.

If the height of the second bracket 900 is over that of the elements mounted on the inverter board 300, the total thickness of the liquid crystal display device is hardly reduced. That is, when the opening is formed in the bottom surface of the mold frame 600 and the inverter board 500 has a reduced height while the second bracket 900 is placed at a lower position than the elements of the inverter board 500, the thickness of the liquid crystal display device can be reduced as much as the thickness of the opening of the mold frame 600.

Figure 11:
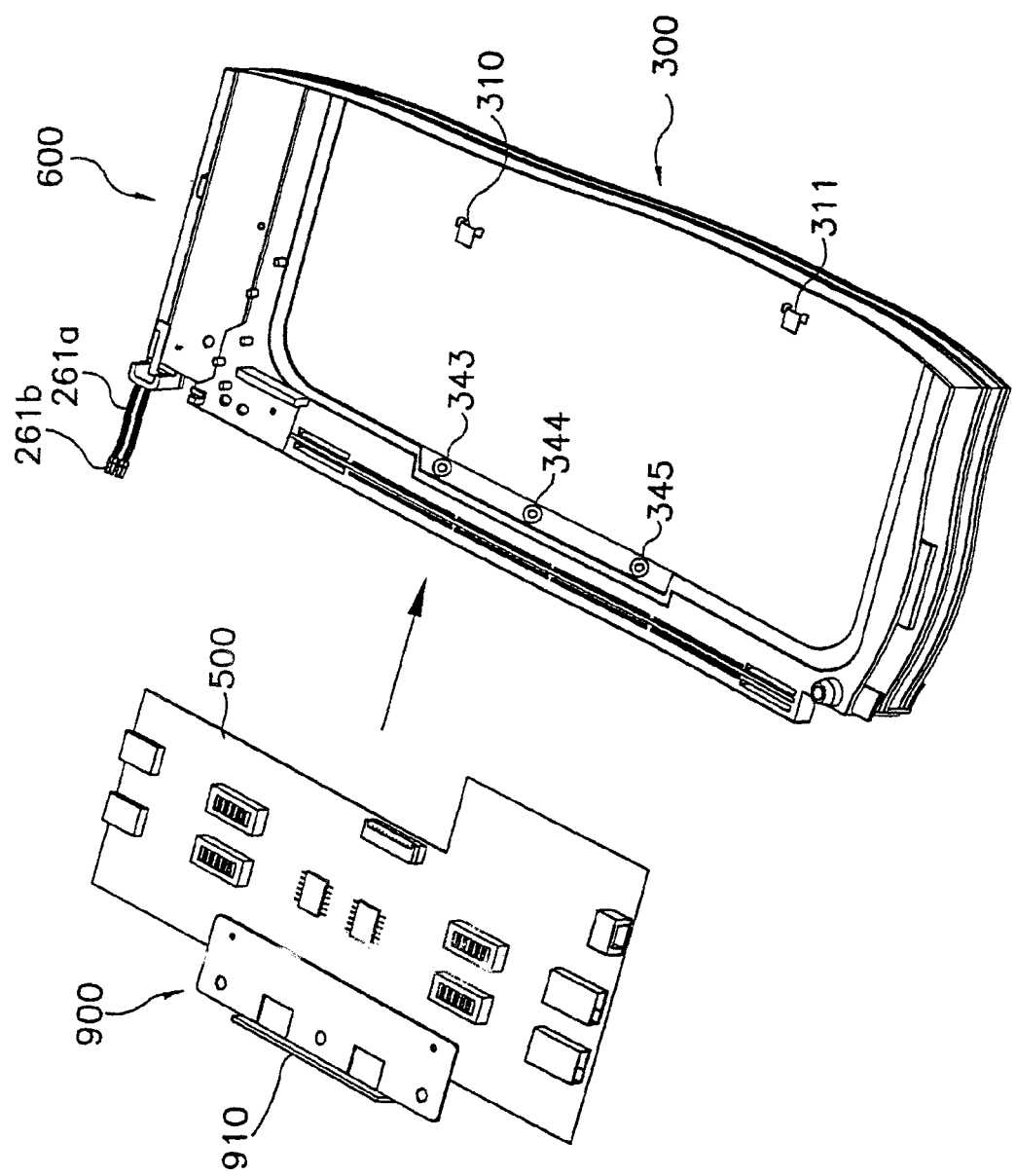
FIGS. 11 and 12 are views showing combination constructions of the inverter board shown in FIG. 9.
Figure 12:
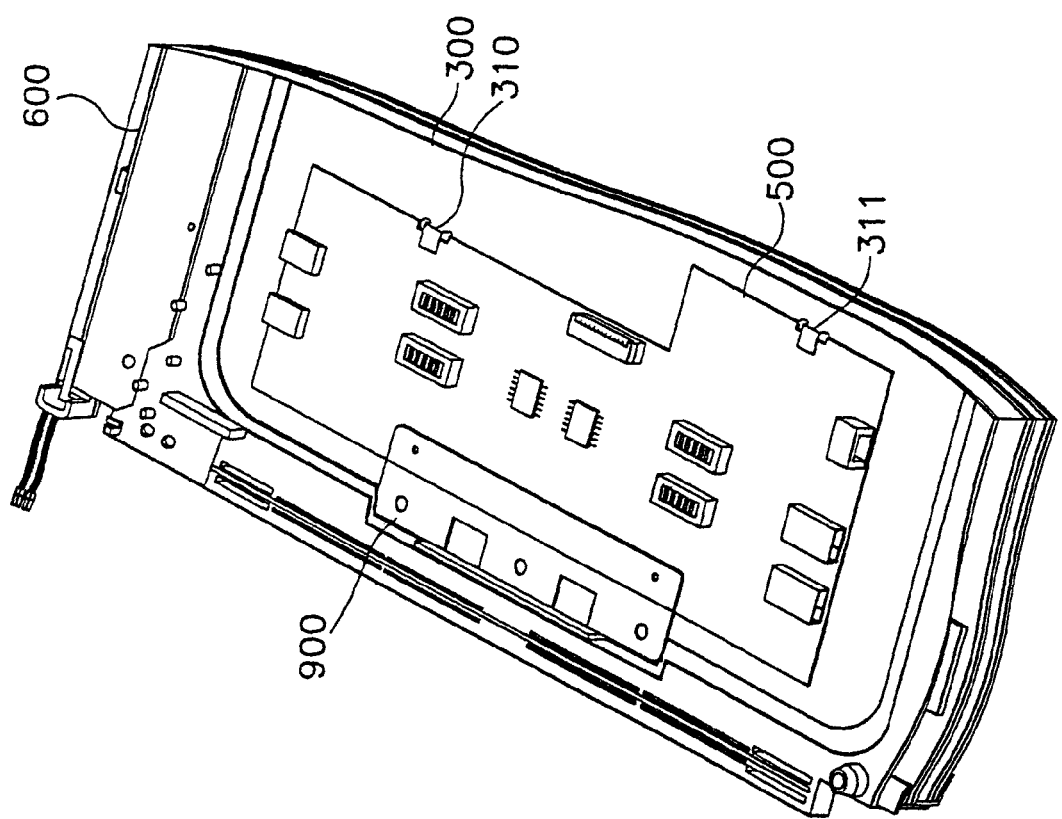

As described above, the inverter board 500 combined with the second bracket 900 is mounted on the rear surface of the bottom chassis 300 by the worker as shown in FIGS. 11 and 12. FIGS. 11 and 12 are perspective views illustrating the steps of mounting the inverter board 500 on the bottom chassis 300.

Referring to FIGS. 11 and 12, the worker holds a grip portion of the second bracket 900 and pushes the inverter board 500 in a direction from the fourth to sixth locking holes 343, 344 and 345 to the first and second projections 310 and 311 of the bottom chassis 300 in order that the edge of the inverter board 500 is pulled towards the first and second projections 310 and 311. If the second bracket 900 has no grip portion, the worker can press a side of the inverter board 500 so that the edge of the inverter board 500 is pulled towards the first and second projections 310 and 311.

When the movement of the inverter board 500 is stopped by means of the first and second projections 310 and 311, the fourth to sixth locking holes 343, 344 and 345 of the bottom chassis 300 respectively face to the ninth to eleventh locking holes 930, 931 and 933 formed in the second bracket 900. As described above, the inverter board 500 mounted on the rear surface of the bottom chassis 300 is maintained in an initially installed state by means of the projections 310 and 311 until the shield case 700 is fixed to the mold frame 600 by means of the screw after being disposed on the mold frame 600.

That is, the first and second projections 310 and 311 not only guide the second bracket 900 so that the ninth to eleventh locking holes 930, 931 and 933 of the second bracket 900 correspond to the fourth to sixth locking holes 343, 344 and 345 of the bottom chassis 300 but also perform the function of preventing the inverter board 500 from departing from the mold frame 600. If the first and the second projections 310 and 311 are not formed at the bottom chassis 300, the inverter board 500 can be departed from the bottom chassis 300 before being fixed to the bottom chassis 300 by means of the screw while the second bracket 900 is guided to the mold frame 500 in order that the ninth to eleventh locking holes 930, 931 and 933 of the second bracket 900 correspond to the fourth to sixth locking holes 343, 344 and 345 of the bottom chassis 300 and the next assembling step is performed.

Figure 13:
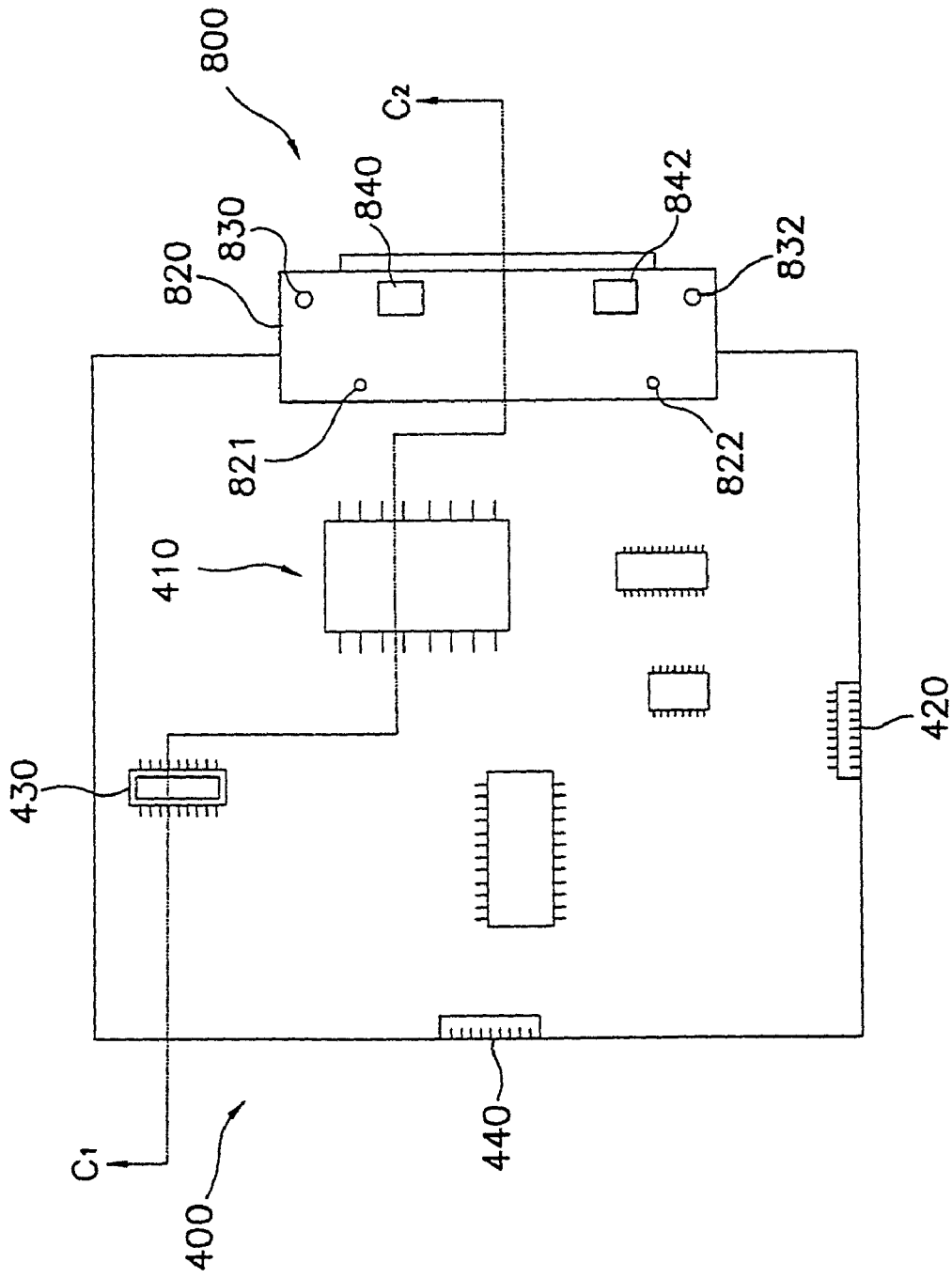
FIGS. 13 to 16 are views showing a construction and combinations stages of an analog/digital board shown in FIG. 3.
Figure 14:
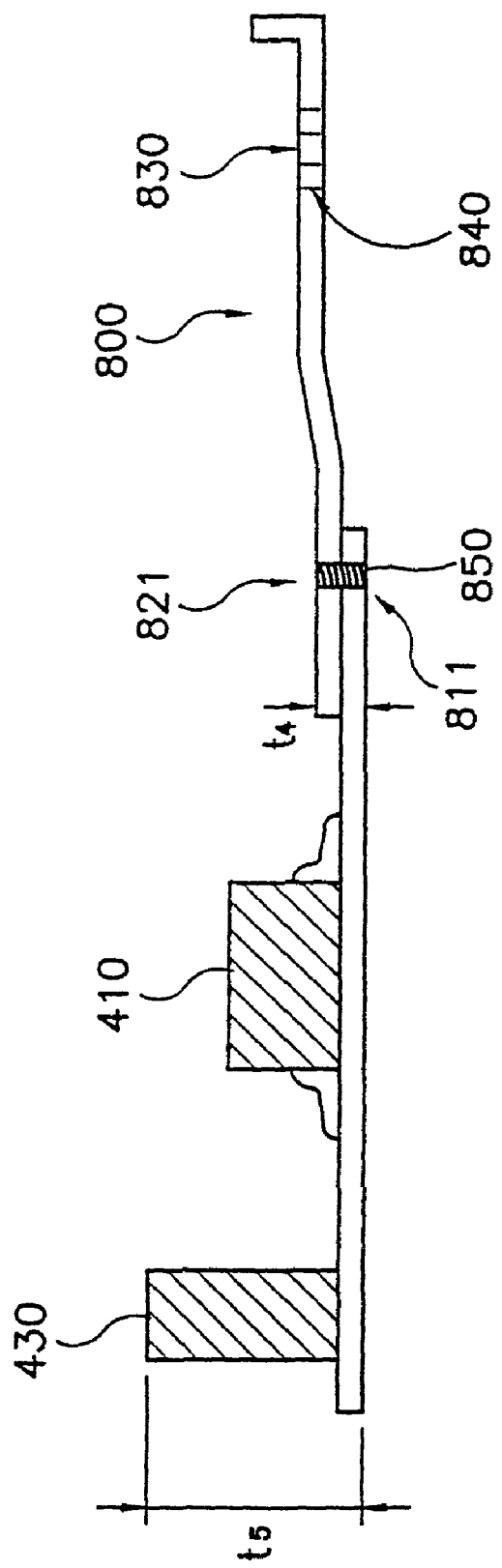

Hereinafter, the constructions of the A/D board 400 and the first bracket 800 will be described with reference to FIGS. 13 to 16. FIG. 13 is a plan view of showing the construction of the A/D board 400 and FIG. 14 is a sectional view of showing the combination construction of the A/D board 400 and the first bracket 800 for combining the A/D board 400 with the bottom chassis 300.

Referring to FIG. 13, a seventh connector 420 for receiving the outer data signals, a circuit element 410 for processing the outer data signal inputted from the seventh connector 420 into the data signal required for the liquid crystal display device, an eighth connector 430 for providing the data signal processed by the circuit element 410 to the integrated printed circuit board 276, and the ninth connector 530 electrically connected to the sixth connector 530 of the inverter board 500 are formed on the A/D board 400.

Although not shown in the drawings, the A/D board 400 has fifth and sixth engaging holes (not shown) formed at an end thereof in the same shape as the first and second engaging holes 540 and 542 formed in the inverter board 500. The first bracket 800 includes a combination surface 820 in which seventh and eighth engaging holes 821 and 822 are formed to correspond to the fifth and sixth engaging holes of the A/D board 400 and a grip portion integrated and formed to be normal to the combination surface 820. The fifth and sixth engaging holes (not shown) are respectively combined with the seventh and eighth engaging holes 821 and 822 by means of the third and fourth engaging screws (not shown) in the same manner as in the first and second engaging screws 940 and 942. The third engaging screw extends through the fifth engaging hole (not shown) and the seventh engaging hole 821, and the fourth engaging screw extends through the sixth engaging hole (not shown) and the eighth engaging hole 822 to combine the A/D board 400 with the first bracket 800, resulting in completing the A/D board as shown in FIG. 13.

The fifth and sixth engaging holes of the A/D board 400 are coated with a conductive pattern that is electrically connected to the first bracket 800. Also, the first bracket 800 is combined with the bottom chassis 300 by means of the screw. Accordingly, the A/D board 400 is earthed through the bottom chassis 300.

Meanwhile, twelfth and thirteenth locking holes 830 and 832 corresponding to the seventh and ninth locking holes 346 and 347 are formed in the combination surface 820 of the first bracket 800. Furthermore, first and second latching holes 840 and 842, corresponding to the fifth and sixth projections 350 and 351 of the bottom chassis 300 are formed at the combination surface 820.

FIG. 14 is a sectional view showing the combination constructions of the A/D board 400 and the first bracket 800, taken along the line C1-C2 shown in FIG. 13.

Referring to FIG. 14, an edge of the combination surface 820 of the first bracket 800 is overlapped with an edge of the A/D board 400 so that the fifth and sixth engaging holes 811 face to the seventh and eighth engaging holes 921 and 822, respectively.

A thickness, i.e. a height t4, at a portion that the A/D board 400 is overlapped with the first bracket 800 is lower than a height t5 from the rear surface of the A/D board 400 to the upper surface of the eighth connector 430 which has the largest size in height among the elements mounted on the A/D board 400.

Therefore, when the A/D board 400 is faced and directly installed to the rear surface of the bottom chassis 300, the height of the overlapped portion of the first bracket 800 and the A/D board 400 is not increased over the height of the elements mounted on the A/D board 400 even if the first bracket 800 is used for combining the A/D board 400 and the bottom chassis 300. In other words, even though the A/D board 400 is faced to and directly combined with the bottom chassis 300 by using the first bracket 800, the thickness of the liquid crystal display device does not increase at all.

If the height of the first bracket 800 is over that of the elements mounted on the A/D board 400, the total thickness of the liquid crystal display device is hardly reduced. That is, when the opening is formed in the bottom surface of the mold frame 600 and the A/D board 400 has a reduced height while the first bracket 800 is placed at a lower position than the elements of the A/D board 400, the thickness of the liquid crystal display device can be reduced as much as the thickness of the opening of the mold frame 600.

Figure 15:
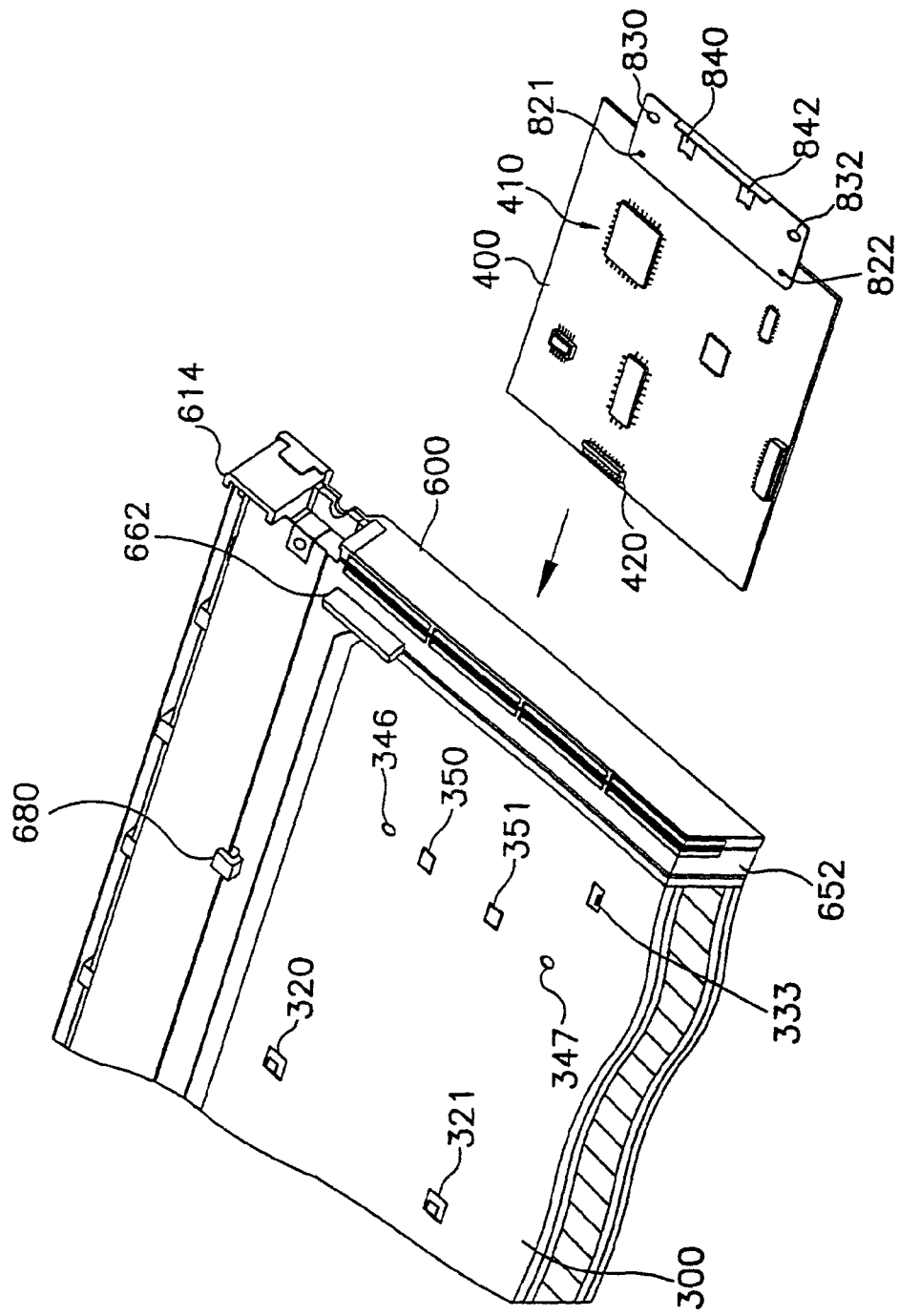
Figure 16:
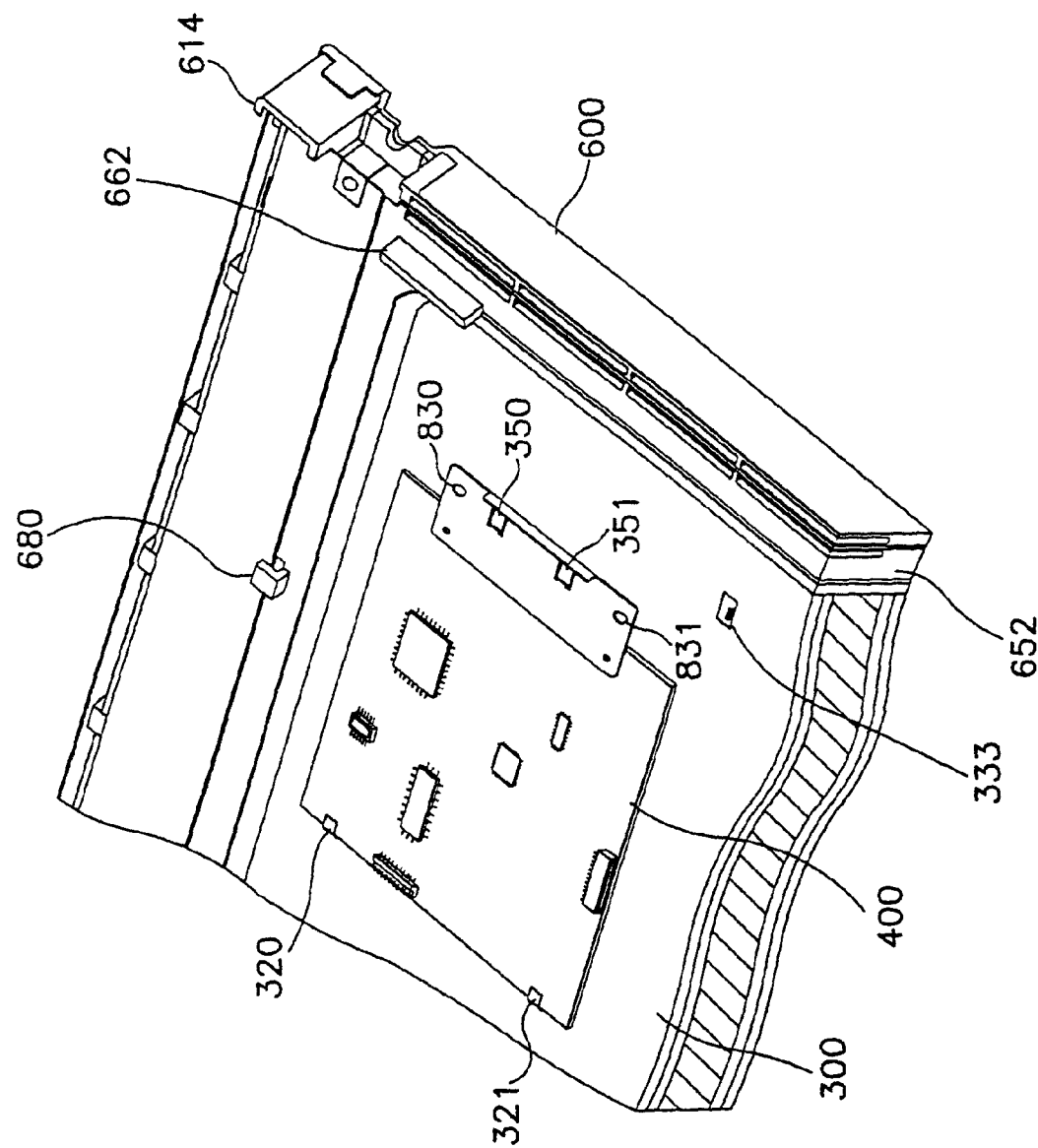

As described above, the A/D board 400 combined with the first bracket 800 is mounted on the rear surface of the bottom chassis 300 by a worker as shown in FIGS. 15 and 16. FIGS. 15 and 16 are perspective views illustrating the steps of mounting the A/D board 400 on the bottom chassis 300.

Referring to FIGS. 15 and 16, the worker holds a grip portion of the first bracket 800 and pushes the A/D board 400 in a direction from the seventh and eighth locking holes 346 and 347 to the third and fourth projections 320 and 321 of the bottom chassis 300 in order that the edge of the A/D board 400 is pulled towards the third and fourth projections 320 and 321. If the first bracket 900 has no grip portion, the worker can press a side of the A/D board 400 so that the edge of the A/D board 400 is pulled towards the third and fourth projections 320 and 321.

When the movement of the A/D board 400 is stopped by means of the third and fourth projections 320 and 321, the seventh and eighth locking holes 346 and 347 of the bottom chassis 300 respectively face to the twelfth and thirteenth locking holes 820 and 832 formed at the first bracket 800. The first and second latching holes 840 and 842 are engaged with the fifth and sixth projections 350 and 351. As described above, the A/D board 400 mounted on the rear surface of the bottom chassis 300 is maintained in an initially installed state by means of the third to sixth projections 320, 321, 350 and 351 until the shield case 700 is fixed to the rear surface of the mold frame 600 by means of the screw after being disposed on the mold frame 600.

The third to sixth projections 320, 321, 350 and 351 not only guide the first bracket 800 so that the twelfth and thirteenth locking holes 830 and 832 of the first bracket 800 correspond to the seventh and eighth locking holes 346 and 347 of the bottom chassis 300 but also perform the function of preventing the A/D board 400 from departing from the mold frame 500. If the third to sixth projections 320, 321, 350 and 351 are not formed at the bottom chassis 300, the A/D board 400 may be departed from the bottom chassis 300 before being fixed to the bottom chassis means of the screw while the first bracket 800 is guided to the mold frame 600 in order that the twelfth and thirteenth locking holes 830 and 832 of the first bracket 800 correspond to the seventh and eighth locking holes 346 and 347 of the bottom chassis 300 and the next assembling step is performed.

Meanwhile, the seventh to tenth projections 330, 331, 332 and 333 are formed in the bottom surface of the bottom chassis 300 in order to prevent the shield case 700 from departing from the rear surface of the mold frame 600 before the shield case 700 is fixed to the mold frame 600 by means of the screws. The projections will be described in detail with reference to the drawings.

Figure 17:
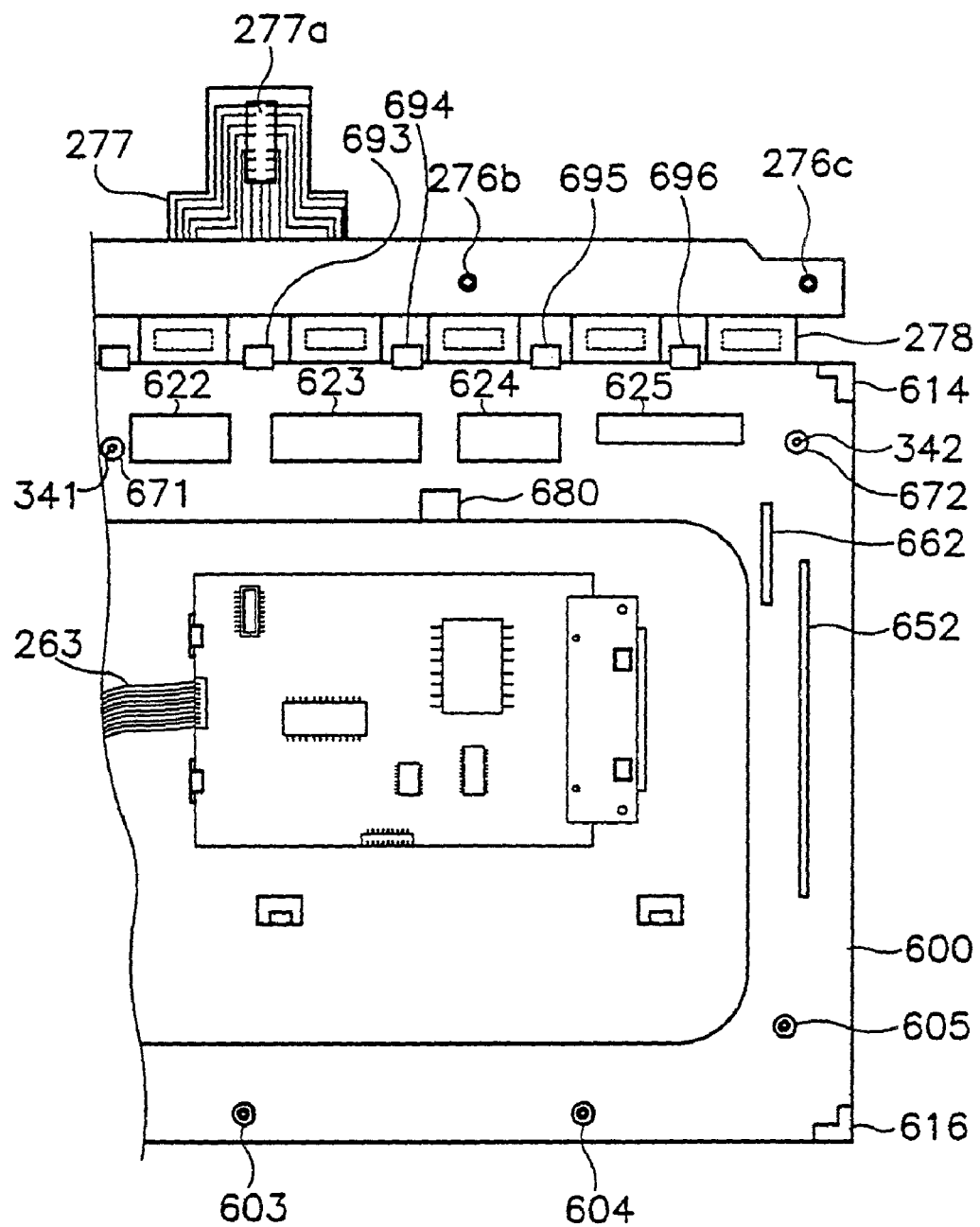
FIGS. 17 and 18 are views showing states in that the inverter board and the analog/digital board are combined with the liquid crystal display device shown in FIG. 5.
Figure 18:
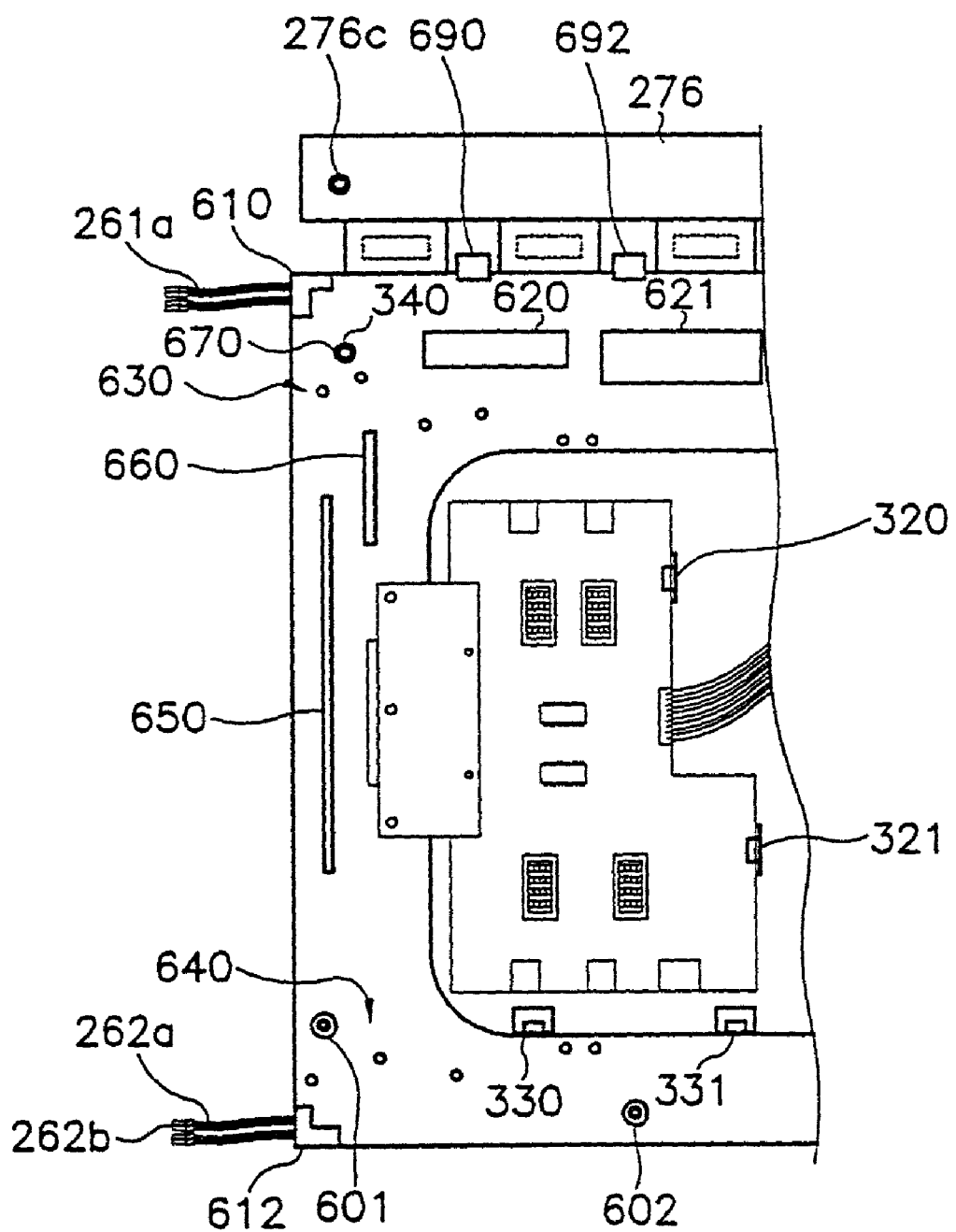

FIGS. 17 and 18 are views showing the construction where the A/D board 400 and the inverter board 500 are mounted on the rear surface of the bottom chassis 300 in such a manner as described above.

As shown in FIGS. 17 and 18, the A/D board 400 is supported by means of the third to sixth projections 320, 321, 350 and 351 and the inverter board 500 is supported by means of the first and second projections 310 and 311.

Hereinafter, the method of guiding the first and second power supply lines 261*a* and 262*a* for supplying the power source with the first and second guide projections 630 and 640 to fix the first and second power supply lines 261*a* and 262*a* to the rear surface of the mold frame 600 will be described with reference to FIGS. 5 to 19. The first and second power supply lines 261*a* and 262*a* for supplying the power source are fixed to the rear surface of the mold frame 600 by means of not only the projection but also the guide grooves or an adhesive tape.

As the first and second power supply lines 261*a* and 262*a* are fixed to the mold frame 600 in the same manner, only the first power supply line 261*a* will be described. Furthermore, it is understood that the first and second lamp units 261 and 262 respectively have two lamps in the preferred embodiments of the present invention.

Figure 19:
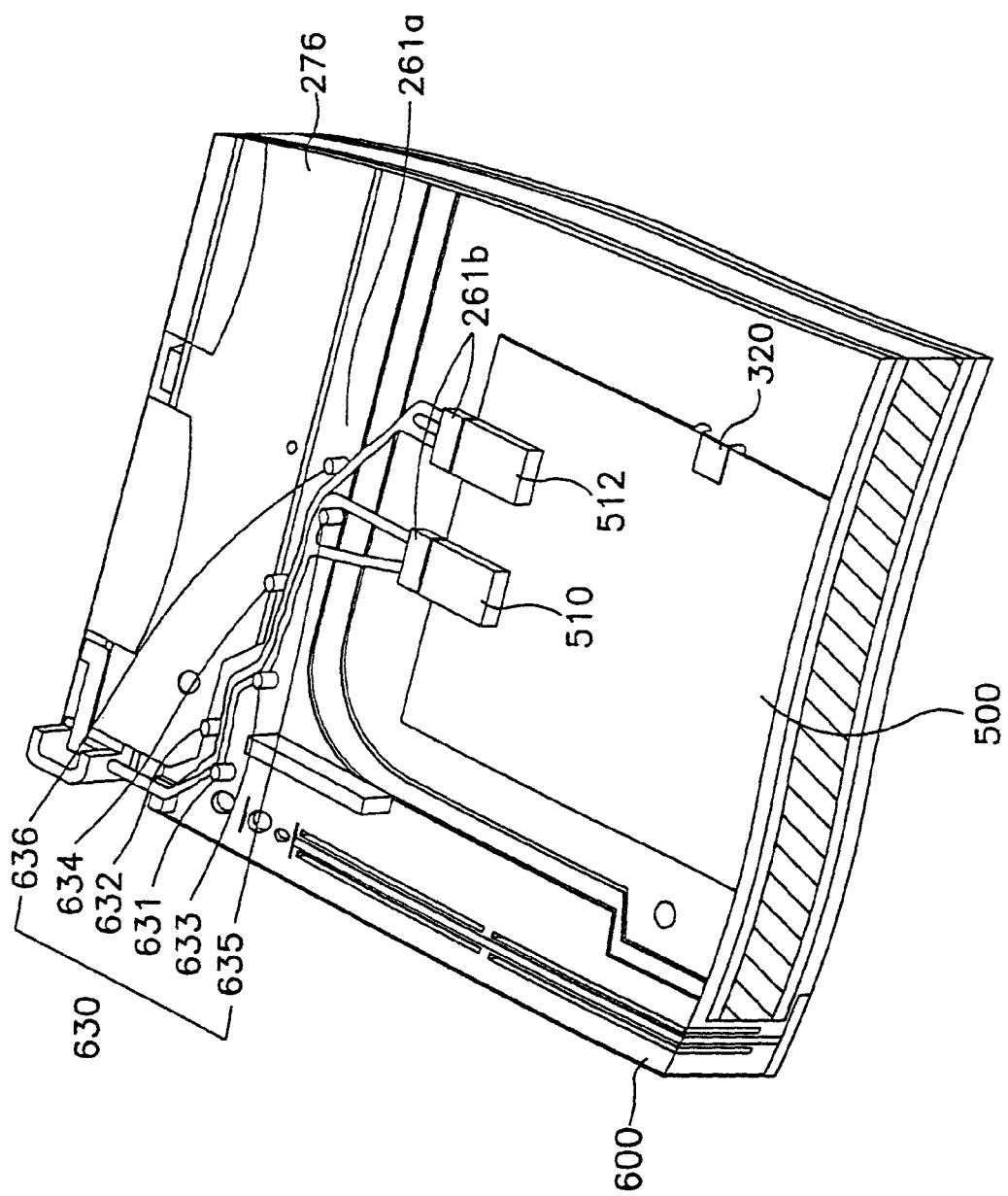
FIG. 19 is a view showing a state in that the power supplying lines shown in FIG. 18 are connected to the rear surface of the liquid crystal display device.

Referring to FIG. 19, the first guide projection 630 includes a plurality of projections 631, 632, 633, 634, 635 and 636 formed and spaced at a predetermined distance from one another on the mold frame 600 between the inverter board 500 and the first lamp unit 261. In FIG. 19, although six guide projections 631, 632, 633, 634, 635 and 636 are depicted as an example, the numbers of the guide projections will be changed according to a product design.

If the first guide projection 630 is not formed on the mold frame 600, the first power supply line 261a for supplying the power source can be departed from the rear surface of the mold frame 600. As a result, the first power supply line 261a for supplying the power source collides with the other structure on the rear surface of the mold frame 600 repeatedly, so that the coating of the first power supply line 261a for supplying the power source can be taken off.

Accordingly, an exposed electric wire of the first power supply line 261a for supplying the power source can be shorted with the integrated printed circuit board 276 and the inverter board 500. If the first power supply line 261a for supplying the power source is not fixed to a certain position on the mold frame 600, the first power supply line 261a prevents the assembling of other structures at the next assembly step, resulting in not performing the process of assembling the liquid crystal display device.

As described above, the first power supply line 261a can be connected in the shortest way with the inverter board 500 mounted on the rear surface of the bottom chassis 300 by means of the first guide projection 630 formed on the rear surface of the mold frame 600.

In addition, the first guide projection 630 can restrain the movement of the first power supply line 261a, which is inserted and fixed to the first guide projection 630, at the step of assembling the liquid crystal display device. Furthermore, the manner of inserting the first power supply line 261a for supplying the power source into a space between the projections of the first guide projection 630 not only makes the first power supply line 261a to be guided to and released from the projections of the first guide projection 630, but also does not require a separate member for fixing the first power supply line 261a to the mold frame 600.

As shown in FIG. 19, the first power supply line 261a for supplying the power source, which is electrically connected with the lamp (not shown) contained in the first lamp unit 261 and extends out of the mold frame 600, can be divided into two power supply lines for supplying the power source so as to be corresponding to the numbers of the lamps. Each of the power supply lines for supplying the power source comprises a hot electrode to which a high voltage is applied and a cold electrode connected to the earth. Two connectors 261b are installed at leading ends of the two power supply lines constructing the first power supply line 261a for supplying the power source to be respectively connected with second and third connectors 510 and 512 formed on the inverter board 500.

The two power supply lines constructing the first power supply line 261a for supplying the power source are guided by the six projections 631, 632, 633, 634, 635 and 636 of the first guide projection 630 spaced apart from each other at a predetermined distance. Two connectors 261 b of the first power supply line 261a for supplying the power source respectively are inserted into the second and third connectors 510 and 512 to be electrically connected with the inverter board 500 to which the power source is applied.

The projections 631, 633 and 635 and the projections 632, 634 and 636, which are opposite to each other among the six projections 631, 632, 633, 634, 635 and 636 so that the first power supply line 261a for supplying the power source is placed between the projections 631, 633 and 635 and the projections 632, 634 and 636, are respectively spaced apart from each other at a predetermined distance enough to apply a force to the first power supply line 261a for supplying the power source so that the first power supply line 261a is not departed from the mold frame 600.

Figure 20:
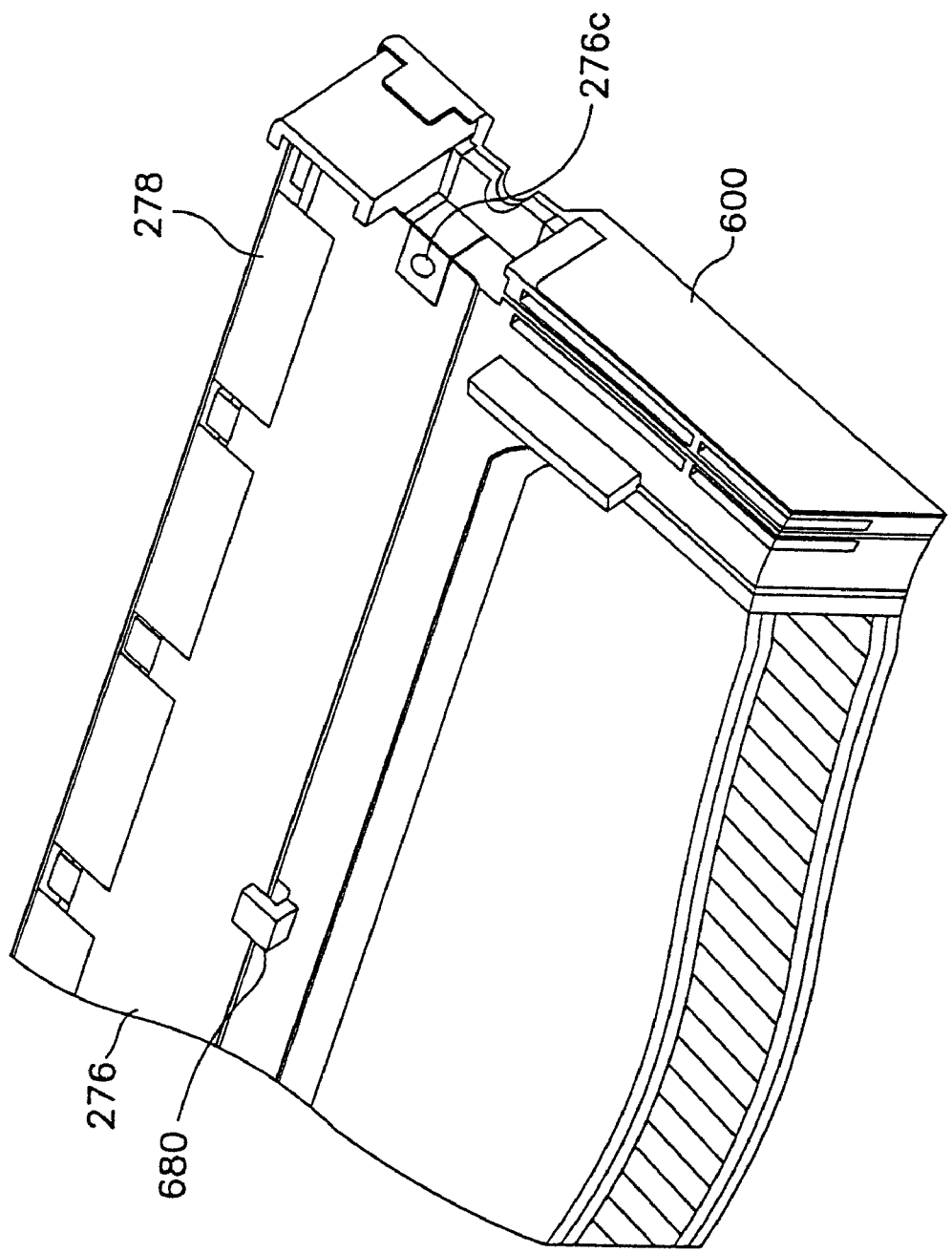
FIG. 20 is a view showing a state in that an integrated printed circuit board shown in FIG. 18 is combined to the rear surface of the liquid crystal display device.

FIG. 20 is a perspective view showing the latch structure for fixing the integrated printed circuit board 276 to the rear surface of the mold frame 600 shown in FIG. 5.

An eleventh projection 680 is formed on the rear surface of the mold frame 600 in order to prevent the integrated printed circuit board 276 from departing from the rear surface of the mold frame 600 until the integrated printed circuit board 276 is bent toward the rear surface of the mold frame 600 and fixed to the bottom chassis 300 by means of the screws (not shown).

The eleventh projection 680 is projected from the mold frame 600 and bent at the top end thereof to a side such as the first to tenth projections 310, 311, 320, 321, 350, 351, 330, 331, 332 and 333 in order to prevent the integrated printed circuit board 276 from departing from the rear surface of the mold frame 600.

If the eleventh projection 680 is not formed on the rear surface of the mold frame 600, it is very difficult to precisely fix the integrated printed circuit board 276 to the bottom chassis 300 when the shield case 700 is combined with the bottom chassis 300 by means of the screws (not shown).

In other words, fourteenth, fifteenth and sixteenth locking holes 276a, 276b and 276c are formed on the integrated printed circuit board 276, which correspond to the first, second and third locking holes 340, 341 and 342 formed on the bottom chassis 300. The integrated printed circuit board 276 is fixed to the bottom chassis 300 by means of the screws respectively extending through seventeenth, eighteenth and nineteenth locking holes 340a, 341a and 342a formed in the shield case 700, the fourteenth, fifteenth and sixteenth locking holes 276a, 276b and 276c and the first, second and third locking holes 340, 341 and 342 in order. That is, the eleventh projection 680 guides the integrated printed circuit board 276 to be bent towards the rear surface of the mold frame 600 so that the seventeenth to nineteenth locking holes 340a, 341a and 342a of the shield case 700, the fourteenth to sixteenth locking holes 276a, 276b and 276c of the integrated printed circuit board 276 and the first to third locking holes 340, 341 and 342 of the bottom chassis 300 are held to be respectively corresponding to one another.

Figure 21:
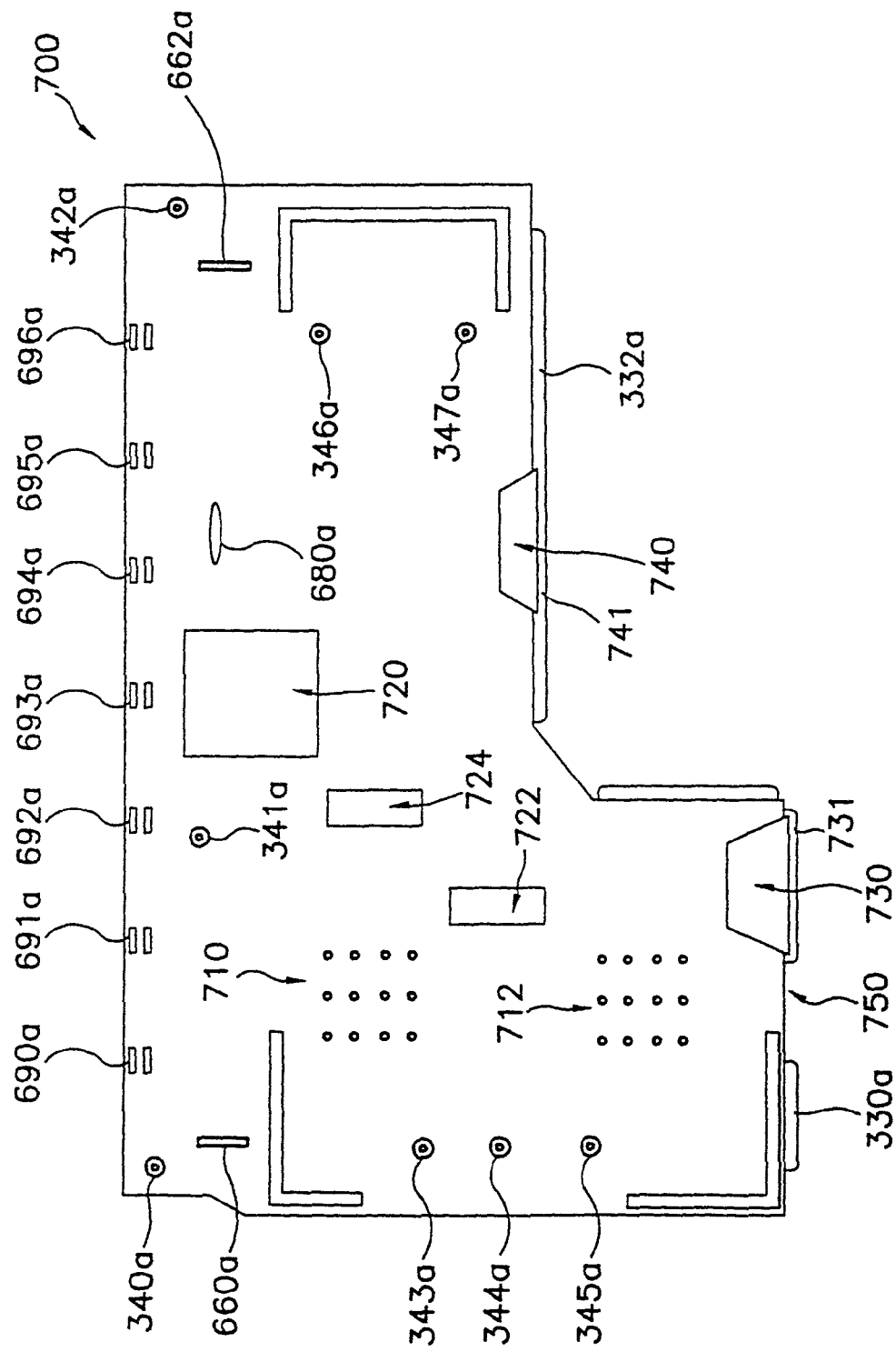
FIG. 21 is a plan view showing a construction of a shield case shown in FIG. 4.

FIG. 21 is a plan view showing the shield case 700 shown in FIG. 3.

Referring to FIG. 21, the shield case 700 protects the A/D board 400 and the inverter board 500 contained in the bottom chassis 300 and insulates electromagnetic waves.

Seventeenth to twenty fourth locking holes 340a, 341a, 342a, 343a, 344a 345a, 346a and 347a are formed in the bottom surface of the shield case 700, which respectively correspond to the first to eighth locking holes 340, 341, 342, 343, 344, 345, 346 and 347 formed in the bottom chassis 300.

Eighth to fourteenth supports 690a, 691a, 692a, 693a, 694a, 695a and 696a for preventing the short circuit are formed at an end of the shield case 700 in order to be respectively corresponding to the first to seventh supports 690, 691, 692, 693, 694, 695 and 696 for preventing the short circuit formed in the mold frame 600. If the first to fourteenth supports 690, 691, 692, 693, 694, 695, 696, 690a, 691a, 692a, 693a, 694a, 695a and 696a are not formed in the mold frame 600 and the shield case 700, the integrated printed circuit board 276 can be electrically contacted with the shield case 700. The reason for this is that the shield case 700 is supported by means of only a sidewall enclosing the shield case 700 and has no supporting member for preventing the body of the shield case 700 from being pushed towards the mold frame 600.

In order to prevent the electric short circuit of the integrated printed circuit board 276 and the shield case 700, the first to seventh supports 690, 691, 692, 693, 694, 695 and 696 for preventing the short circuit are projected at the predetermined height from the mold frame 600 and the eighth to fourteenth supports 690a, 691a, 692a, 693a, 694a, 695a and 696a for preventing the short circuit are depressed in the mold frame 600.

Accordingly, the integrated printed circuit board 276 is spaced at a predetermined distance apart from the shield case 700 by the connection of the first to seventh supports 690, 691, 692, 693, 694, 695 and 696 and the eighth to fourteenth supports 690a, 691a, 692a, 693a, 694a, 695a and 696a, so that the electric contact between the integrated printed circuit board 276 and the shield case 700 can be prevented.

Meanwhile, first and second openings 710 and 712 for discharging heat are formed in an area of the shield case 700 on which the inverter board 500 is disposed, in order to facilitate a discharge of the heat generated from the inverter board 500 outside. The first and second openings 710 and 712 for discharging heat are preferably formed in the shield case 700 to be opposite to an element such as a transformer 550, which generates the most heat, among the parts constructing the inverter board 500.

Furthermore, the shield case 700 is partially cut at the bottom surface thereof to form first, second and third windows 720, 722 and 724. The worker can identify through the first window 720 whether the connector 277a of the integrated printed circuit board 276 is normally connected with the eighth connector 430 of the A/D board 400. In addition, the worker can identify through the second and third windows 722 and 724 whether the line 263 for electrically connecting the inverter board 500 with the A/D board 400 is normally connected with the sixth and ninth connectors 530 and 440.

If the first, second and third windows 720, 722 and 724 are not formed in the shield case 700, the worker or a user must dismantle and combine the bottom chassis 300 from/with the shield case 700 every time in order to identify whether the connectors connecting the integrated printed circuit board 276 with the A/D board 400 or the A/D board 400 with the inverter board 500 are normally connected with each other.

Furthermore, the shield case 700 has first and second connection segments 730 and 740 formed in a sidewall thereof adjacent to an end opposite to the other end at which the eighth to fourteenth supports 690a, 691a, 692a, 693a, 694a, 695a and 696a are formed. After the shield case 700 is mounted on the rear surface of the mold frame 600, the worker can connect the line for supplying the outer power source to the inverter board 500 and the line for providing the outer data signals to the A/D board 400 with the first connector 524 and the seventh connector 420 through the first and second connection segments 730 and 740.

However, the sidewall in which the first and second connection segments 730 and 740 are formed is not completely opened. In other words, the first and second connection segments 730 and 740 are formed in a form of an opening closed by the shield case 700. In the preferred embodiment of the present invention, the first and second connection segments 730 and 740 are partially connected at bottom portions thereof with each other by means of first and second connecting parts 731 and 741.

The reason for forming the first and second connection segments 730 and 740 in a closed form as described above is that it is possible to improve the capability of the shield case 700 for insulating electromagnetic waves. The improvement of the shielding capability of the shield case 700 by the first and second connecting parts 731 and 741 will be described below with reference to graphs. First, second and third latching parts 660a, 662a, and 680a respectively corresponding to the first stopper 660, the second stopper 662 and the eleventh projection 680 are all formed on the shield case 700.

Furthermore, the other end of the shield case 700 is bent to form latching ribs 330a and 332a on the sidewall of the shield case 700 in which the first and second connection segments 730 and 740 are formed. The latching ribs 330a and 332a are engaged with the seventh to tenth projections 330, 331, 332 and 333 to prevent the shield case 700 from departing from the mold frame 600.

Particularly, as being exposed through the third latching part 680a out of the shield case 700, the eleventh projection 680 prevents the shield case 700 from departing from the rear surface of the mold frame 600 along with the seventh to tenth projections 330, 331, 332 and 333 formed on the bottom chassis 300.

As the seventh to eleventh projections 330, 331, 332, 333 and 680 are formed on the bottom chassis 300, it facilitates the adjusting of positions of the locking holes respectively formed in the shield case 700, the inverter board 500, the A/D board 400, the integrated printed circuit board 276 and the bottom chassis 300 and the assembling of the liquid crystal display device while the shield case 700, the inverter board 500, the A/D board 400, the integrated printed circuit board 276 and the bottom chassis 300 are combined with one another by means of the screws.

Hereinafter, mounting and fixing the shield case 700 to the rear surface of the mold frame 600 will be described with reference to FIGS. 22 to 24.

Firstly, the A/D board 400, the inverter board 500 and the integrated printed circuit board 276 are mounted on the rear surface of the bottom chassis 300 or the mold frame 600, as shown in FIG. 18. Then, when the first and second power supply lines 261a and 262a for supplying the power source are respectively guided by means of the first and second guide projections 630 and 640 to be connected to the inverter board 500 and when a connector 277a of the integrated printed circuit board 276 is connected to the A/D board 400, the shield case 700 is mounted on the rear surface of the mold frame 600.

Figure 22:
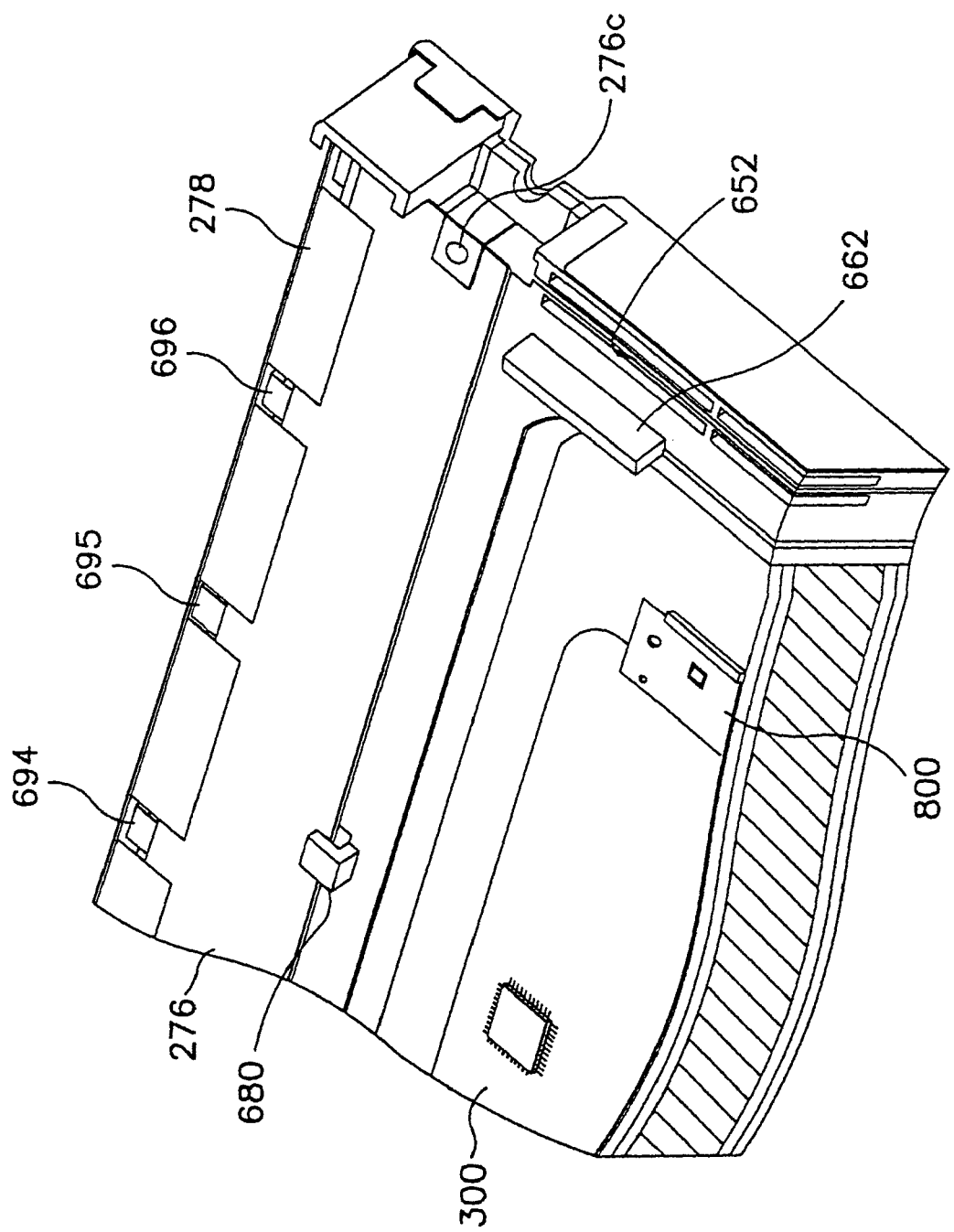
FIGS. 22 to 24 are views showing a state in that the shield case shown in FIG. 21 is combined to the rear surface of the liquid crystal display device.
Figure 23:
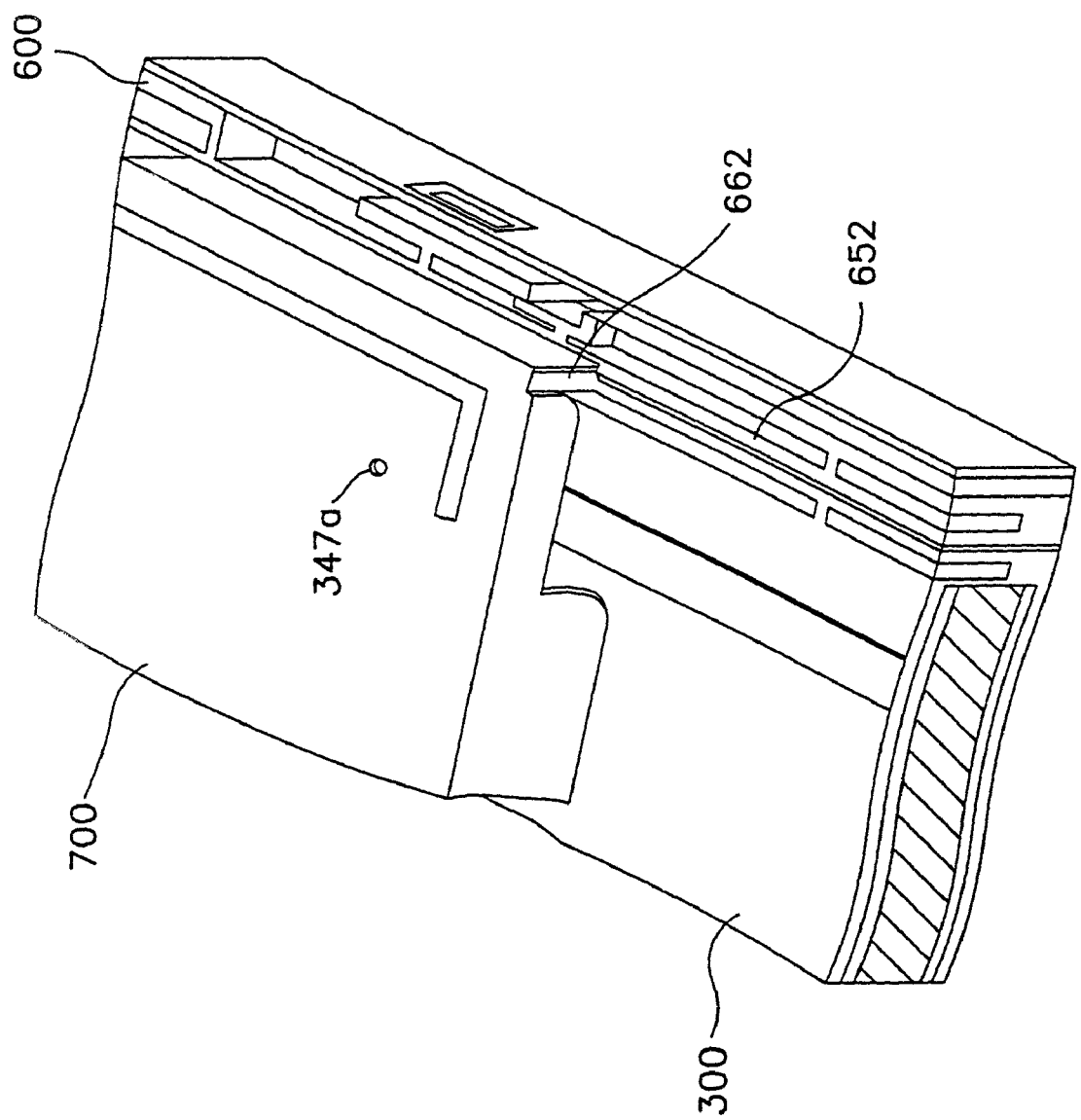
Figure 24:
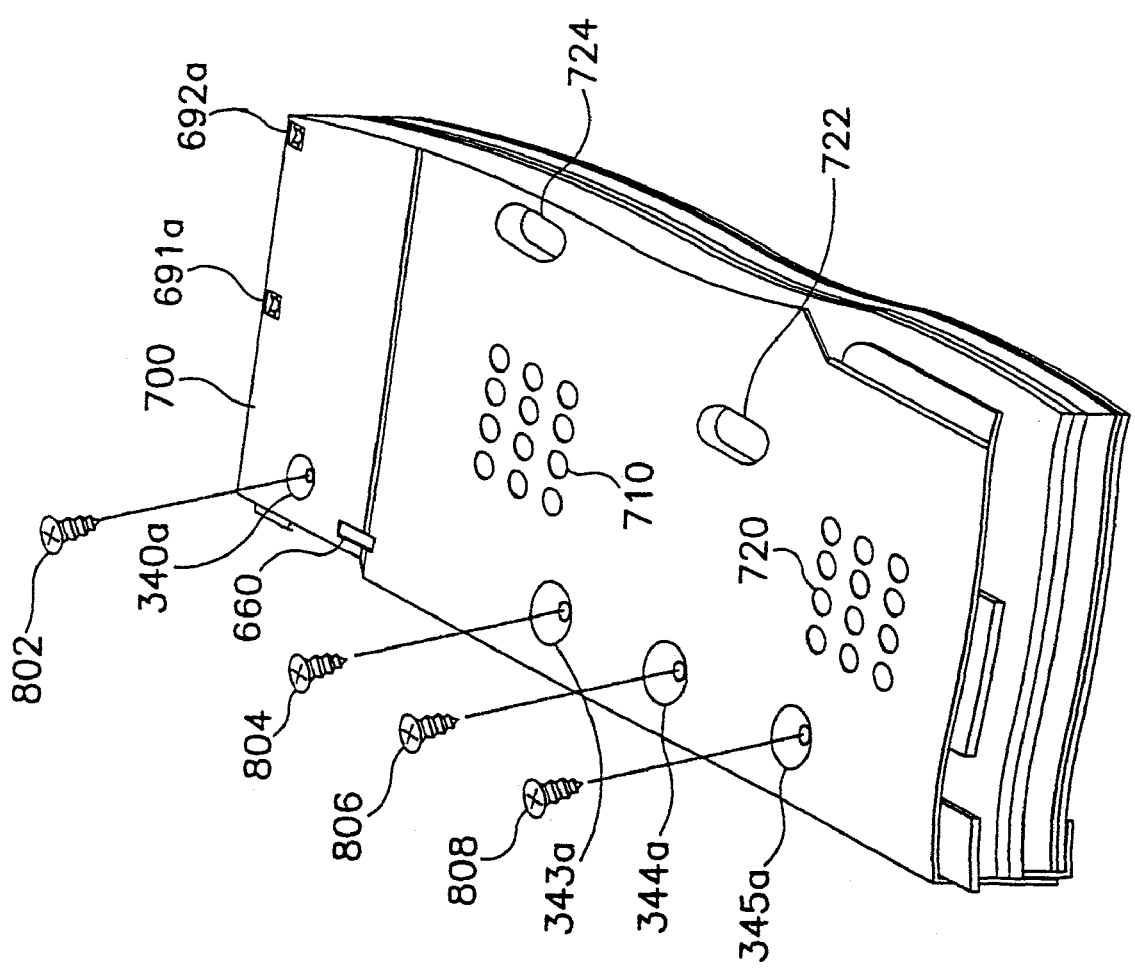

As shown in FIGS. 22 and 24, one sidewall of the shield case 700 is guided by means of the second guide groove 652 to slide from the integrated printed circuit board 276 along the rear surface of the mold frame 600. The other sidewall opposite to the one sidewall of the shield case 700 slides along the first guide groove 650 to move to a position at which the shield case 700 is fixed.

As described above, the movement of the shield case 700 sliding along the first and second guide grooves 650 and 652 is stopped as the first and second latching parts 660a and 662a are latched by means of the stoppers 660 and 662. At that time, the latching ribs 330a and 332a of the shield case 700 are guided by and engaged with the seventh to tenth projections 330, 331, 332 and 333 for preventing the shield case 700 from departing from the bottom chassis 300. Furthermore, the eleventh projection 680 for preventing the departure of the integrated printed circuit board 276 extends through the third latching hole 680a to be exposed out of the shield case 700, not shown in FIG. 24.

When the first to fourth screws 802, 804, 806 and 808 shown in FIG. 24 extend through the seventeenth, twentieth, twenty first and twenty second locking holes 340a, 343a, 344a and 345a to fix the shield case 700 to the mold frame 600 after the shield case 700 is mounted on the rear surface of the mold frame 600 as described above, the shield case 700 is mounted on the rear surface of the mold frame 600 while enclosing the A/D board 400 and the inverter board 500.

Here, the first screw 802 extends through the seventeenth, fourteenth and first locking holes 340a, 276a and 240 in order and the second screw 804 extends through the twentieth, ninth and fourth locking holes 343a, 930 and 343 in order. Similarly, the third screw 806 extends through the twenty first, tenth and fifth locking holes 344a, 910 and 344 in order and the fourth screw 808 extends through the twenty second, eleventh and fifth locking holes 345a, 933 and 345 in order. That is, since the integrated printed circuit board 276, the shield case 700 and the inverter board 500 are fixed to the bottom chassis 300 by means of the first to fourth screws 802, 804, 806 and 808, the liquid crystal display device can be easily and rigidly assembled in a short time.

Although the first to fourth screws 802, 804, 806 and 808 are only depicted in FIG. 24, it is understood that screws extend through the eighteenth, nineteenth, twenty-third and twenty-fourth locking holes 341a, 342a, 346a and 347a of the shield case 700 to combine the shield case 700 to the bottom chassis 300. In particular, the A/D board 400 is rigidly combined and fixed to the bottom chassis 300 by means of the screws extending through the twenty-third and twenty-fourth locking holes 346a and 347a.

Figure 25:
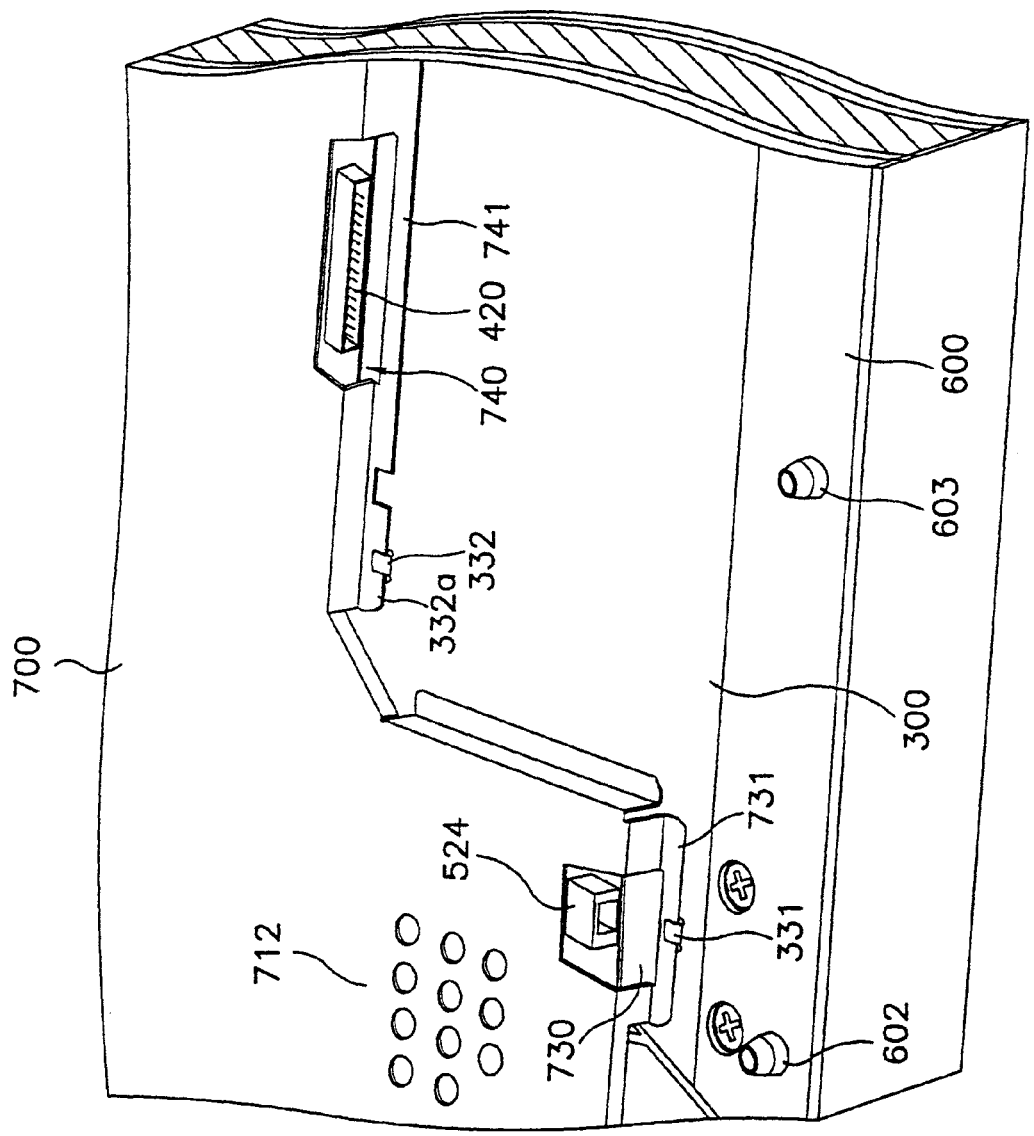
FIG. 25 is a perspective view illustrating a construction of the shield shown in FIG. 21, which is capable of shielding an electromagnetic wave.

FIG. 25 is a perspective view of showing the combination construction in which the shield case 700 is mounted on the rear surface of the mold frame 600, in which they are cut partially.

Referring to FIG. 25, the latching rib 332a and the connecting part 731 of the shield case 700 are guided by the eighth and ninth projections 331 and 332 for preventing the departure of the shield case 700. The inverter board 500 and the A/D board 400 are contained in the shield case 700. The first connector 524 of the inverter board 500 and the seventh connector 420 of the A/D board 400 are exposed in the connection openings 730 and 740 of the shield case 700. The line for supplying the power source and the line for providing the outer data signals are connected to the first and second connectors 524 and 420 through the first and second connection openings 730 and 740.

Meanwhile, second and third supporting projections 602 and 603 among first to fifth supporting projections 601, 602, 603, 604 and 605 are formed on the mold frame 600 which is placed under the shield case 700 as shown in FIG. 5. The first to fifth supporting projections 601, 602, 603, 604 and 605 perform the prevention of the liquid crystal display panel 271 and the structures thereof from being bent when a force is applied to the liquid crystal display panel 271 of the liquid crystal display device.

As described above, the first and second connection openings 730 and 740 of the shield case 700 are connected with each other by means of the first and second connecting parts 731 and 741 and maintain a closed state in order to improve an insulation efficiency of the shield case 700 for electromagnetic waves.

The insulation efficiency of the shield case 700 for electromagnetic waves according to the shape of the first and second connecting parts 731 and 741 is shown in FIGS. 26A to 27B.

Figure 26A:
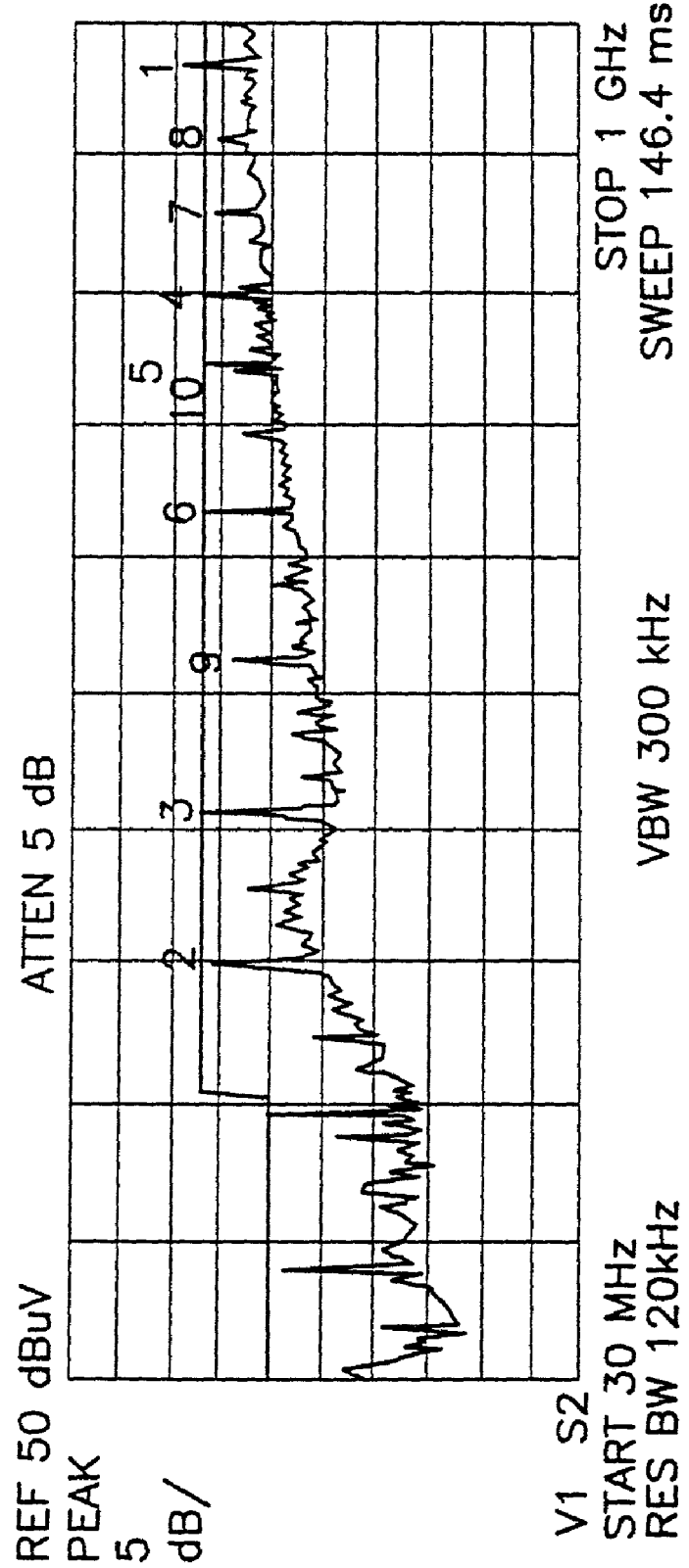
FIGS. 26 and 27 are graphs illustrating changes of intensity of the electromagnetic wave according to the construction of the shield case shown in FIG. 25.
Figure 26B:
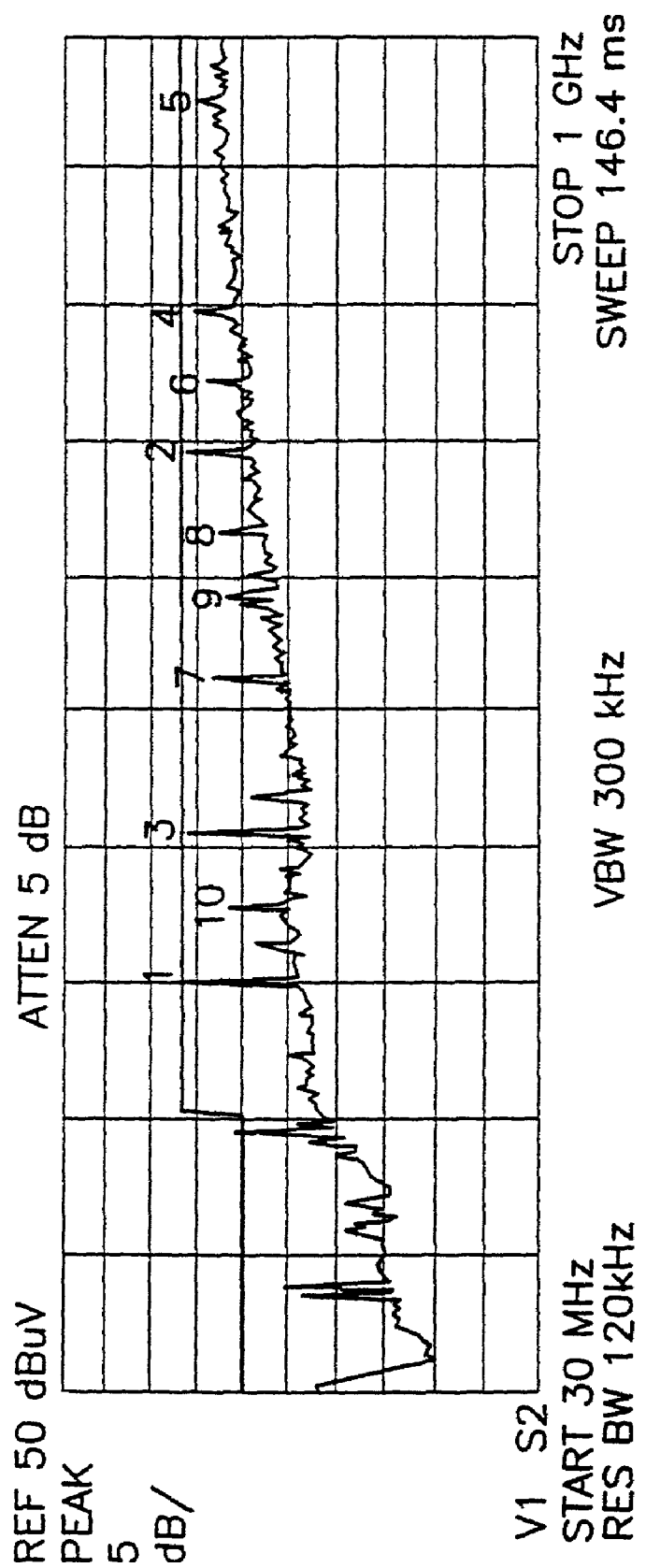
Figure 27A:
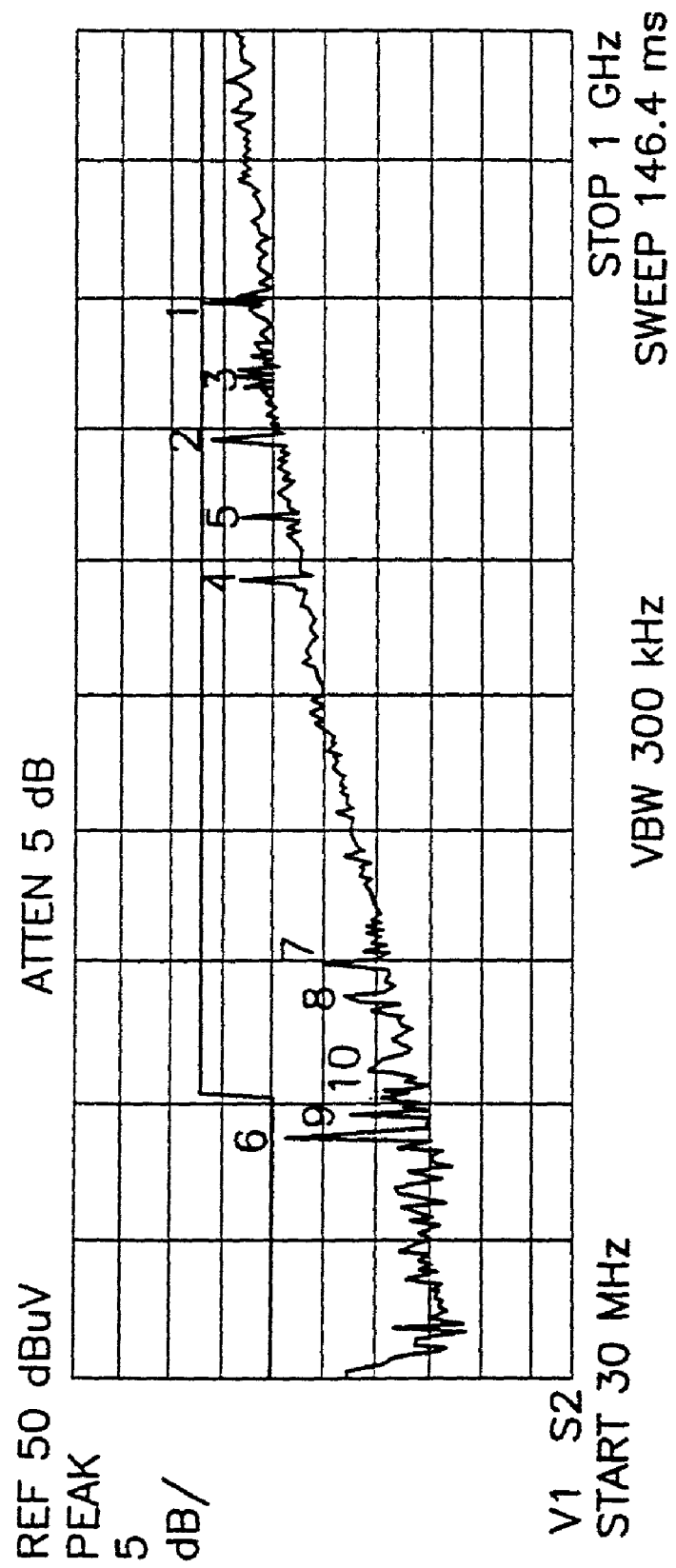
Figure 27B:
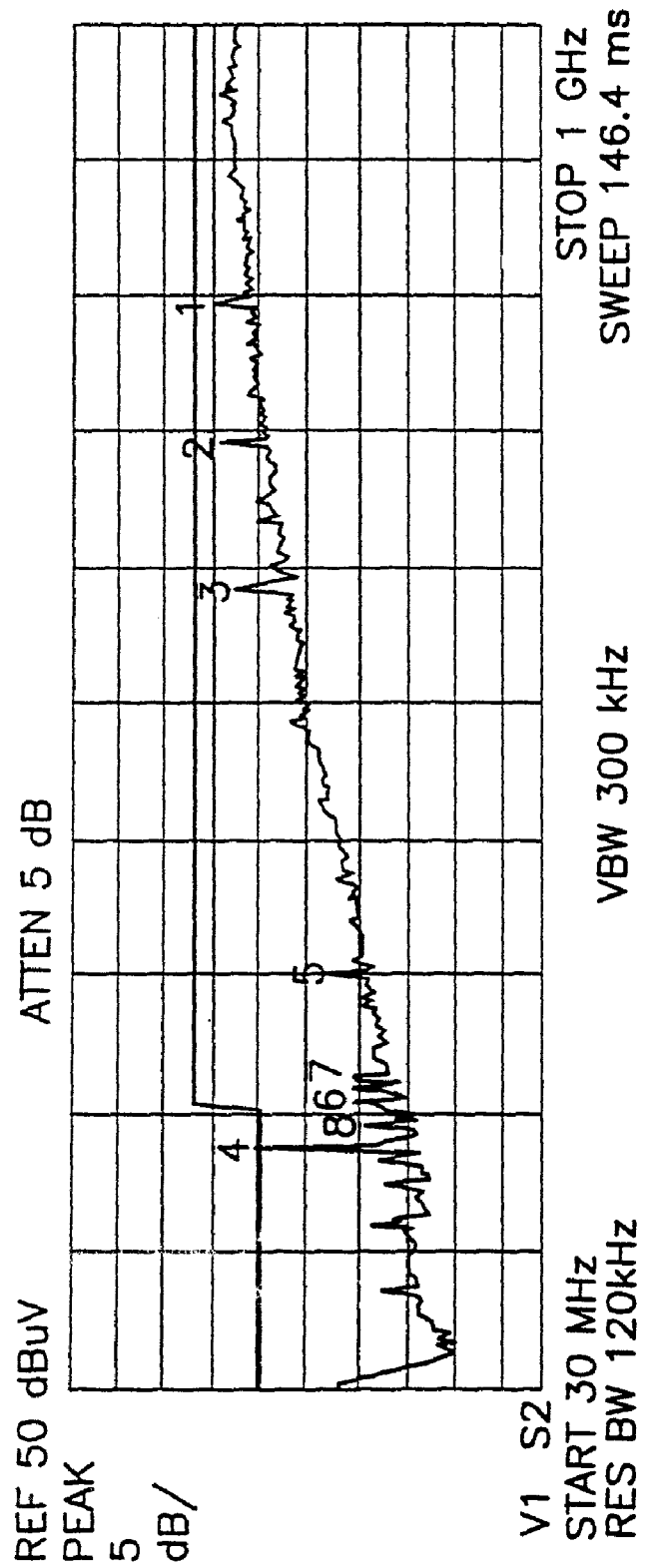

FIGS. 26A and 26B show an extent of an electromagnetic wave according to horizontal and vertical frequencies in the case of not forming the first and second connecting parts 731 and 741 on the shield case 700 and FIGS. 27A and 27B show the extent of the electromagnetic wave according to the horizontal and vertical frequencies in a case of forming the first and second connecting parts 731 and 741 on the shield case 700. Furthermore, tables 1 and 2 show the extent of the electromagnetic wave at a certain horizontal and vertical frequencies according to the presence and absence of the first and second connecting parts 731 and 741.

A change of the extent of the electromagnetic wave in the horizontal frequency bands will be described with reference to FIGS. 26A and 27A and the table 1.

TABLE 1

|   | None | | Connecting parts | |
|---|---|---|---|---|
|   | Horizontal frequency (MHz) | Amplitude (dBμV) | Horizontal frequency (MHz) | Amplitude (dBμV) |
| 1 | 968.5 | 38.44 | 801.2 | 36.28 |
| 2 | 323.4 | 38.34 | 701.7 | 36.01 |
| 3 | 430.1 | 37.08 | 747.8 | 33.62 |
| 4 | 801.2 | 36.78 | 599.9 | 32.96 |
| 5 | 752.7 | 36.62 | 646.0 | 32.95 |
| 6 | 646.0 | 36.58 | 199.8 | 28.57 |
| 7 | 861.8 | 35.58 | 323.4 | 24.73 |
| 8 | 915.1 | 35.22 | 299.2 | 22.88 |
| 9 | 539.3 | 33.82 | 216.7 | 22.36 |
| 10 | 747.8 | 33.52 | 248.3 | 20.52 |

TABLE 2

|   | None | | Connecting part | |
|---|---|---|---|---|
|   | Vertical frequency (MHz) | Amplitude (dBμV) | Vertical frequency (MHz) | Amplitude (dBμV) |
| 1 | 323.4 | 36.7 | 801.2 | 34.44 |
| 2 | 701.7 | 36.34 | 701.7 | 33.83 |
| 3 | 430.1 | 36.19 | 597.5 | 32.44 |
| 4 | 801.2 | 35.54 | 199.8 | 30.42 |
| 5 | 951.5 | 35.04 | 323.4 | 24.82 |
| 6 | 752.7 | 34.03 | 243.4 | 243.4 |
| 7 | 539.3 | 33.31 | 250.7 | 250.7 |
| 8 | 646.0 | 32.79 | 233.7 | 233.7 |
| 9 | 597.5 | 32.18 |   |   |
| 10 | 376.8 | 31.61 |   |   |

Firstly, the extent of the electromagnetic wave is greatly reduced at the same horizontal frequency band in a case of forming the connecting parts on the shield case 700. That is, at the horizontal frequencies of 323.4 MHz, 801.2 MHz and 646.0 MHz, the extent of the electromagnetic wave respectively shows 24.73 dBμV, 36.28 dBμV and 32.95 dBμV in use of the connecting parts. However, at the same horizontal frequencies, the extent of the electromagnetic wave respectively shows 38.34 dBμV, 36.78 dBμV and 36.58 dBμV in absence of the connecting parts.

Furthermore, in the case of measuring the extent of the electromagnetic wave in the other horizontal frequencies, it is known that the shield case 700 having the first and second connecting parts 731 and 741 generates the electromagnetic wave less than the shield case having no connecting parts 731 and 741 at the most horizontal frequencies and especially, the extents of the electromagnetic wave in the shield case 700 having the connecting parts 731 and 741 that are lower that that of the lowest amplitude, i.e. 33.52 dBμV at the horizontal frequency of 747.8 MHz in the case of not forming the connecting parts 731 and 741 in the shield case 700. It is understood that the extent of the electromagnetic wave is very small in the horizontal frequency of 968.5 MHz in the case of the shield case 700 having the first and second connecting parts 731 and 741 in table 1, as illustrated in FIGS. 26A and 27A.

The change of the extent of the electromagnetic wave in the vertical frequency bands will be described with reference to FIGS. 26B and 27B and the table 2.

Firstly, the extent of the electromagnetic wave is greatly reduced at the same vertical frequency band in a case of forming the connecting parts 731 and 741 on the shield case 700. That is, at the vertical frequencies of 323.4 MHz, 701.7 MHz and 801.2 MHz, the extents of the electromagnetic wave respectively show 24.82 dBμV, 33.83 dBμV and 34.44 dBμV in use of the connecting parts 731 and 741. However, at the same vertical frequencies, the extent of the electromagnetic wave respectively shows 36.7 dBμV, 36.34 dBμV and 35.54 dBμV in absence of the connecting parts 731 and 741.

Furthermore, in the case of measuring the extent of the electromagnetic wave in other vertical frequencies, it can be noted that the shield case 700 having the first and second connecting parts 731 and 741 generates the electromagnetic wave less than the shield case 700 having no connecting parts 731 and 741 at the most vertical frequencies and especially, the extent of the electromagnetic wave in the shield case 700 having the connecting parts 731 and 741 that are lower that that of the lowest amplitude, i.e. 31.61 dBμV at the vertical frequency of 376.8 MHz in the case of not forming the connecting parts 731 and 741 in the shield case 700. It is noted that the extent of the electromagnetic wave is very small in the vertical frequency of 430.1 MHz in the case of the shield case 700 having the first and second connecting parts 731 and 741 in the table 2, as illustrated in FIGS. 26B and 27B.

As described above, when the shield case 700, the inverter board 500, the A/D board 400 and the integrated and printed circuit board 276 are mounted on the back surface of the bottom chassis 300 and/or the mold frame 600, the liquid crystal display device is assembled with the front case 210 defining the efficiency screen area of the liquid crystal display device and the rear case 222, thereby completing the thin and light monitor device.

According to the liquid crystal display device as described above, the inverter board for supplying the power source to the lamp unit and the A/D board for converting and providing the outer data signals to the integrated printed circuit board are in close contact with and combined to the rear surface of the bottom chassis.

Furthermore, the brackets, which are used for fixing the A/D board and the inverter board to the bottom chassis, are lower in height than the highest element among the elements constructing the A/D board and the inverter board. Accordingly, it is possible to reduce the total thickness of the liquid crystal display device.

In addition, it is possible that the brackets, which are used for fixing the A/D board and the inverter board to the bottom chassis, are made to have an area enough to form the locking holes in which the screws extend. Accordingly, the brackets are substituted for brackets having the size equal to that of the liquid crystal display panel to facilitate fixing the A/D board and the inverter board to the bottom chassis, resulting in reducing the weight of the liquid crystal display device.

The shield case for insulating the electromagnetic wave of the liquid crystal display device, the inverter board, the integrated printed circuit board and the A/D board have the locking holes formed at corresponding positions, which are combined to the bottom chassis by means of the screws extending through the locking holes respectively formed therein. Therefore, the assembly capacity of the liquid crystal display device may be improved and the manufacturing cost of the liquid crystal display device can be reduced as a small number of parts are used.

Furthermore, a plurality of projections are formed on the mold frame at a predetermined distance from one another in order to receive the power supply line for supplying the power source from the inverter board to lamp units. Accordingly, the power supply line is prevented from departing from the rear surface of the mold frame, to thereby facilitate the insertion and the removal of the power supply line in/from the projections and to prevent the damage of the power supply line due to a friction with other structures.

In the monitor device having the construction as described above, the displaying section, the receiving section for receiving the displaying section and the printed circuit board for operating the displaying section are faced to and directly mounted on the rear surface of the bottom chassis to be lower than the height of the total receiving section. The thin and light liquid crystal display device is assembled with the front case defining the efficient screen area and the rear case opposite to the front case, resulting in completing the thin and light monitor device.

Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A liquid crystal display device comprising:
   light generating means for generating a light;
   receiving means for receiving the light generating means;
   power supplying means mounted on a rear surface of the receiving means, for supplying a power to the light generating means;
   power supplying lines connected between the light generating means and the power supplying means, for supplying the power to the light generating means, the power supplying lines having a portion disposed on the rear surface of the receiving means; and
   fixing means formed on the rear surface of the receiving means for guiding the portion of the power supplying lines disposed on the rear surface of the receiving means to the power supplying means and preventing the power supplying lines from being departed from the receiving means,
   wherein the fixing means comprises a plurality of projections spaced apart from one another at a predetermined distance so that the power supplying lines are placed between the projections.

2. The liquid crystal display device of claim 1, wherein the fixing means further comprises guide grooves formed on the rear surface of the receiving means, or an adhesive tape.

3. The liquid crystal display device of claim 1, wherein the light generating means is a cold cathode type of a fluorescent lamp.

4. The liquid crystal display device of claim 1, wherein the receiving means includes a bottom chassis for receiving the light generating means and a mold frame for receiving the bottom chassis, which has an opening formed in a bottom surface of the mold frame.

5. The liquid crystal display device of claim 4, wherein the power supplying means is disposed on the rear surface of the bottom chassis and the fixing means is formed on the mold frame to be placed between the power supplying means and the light generating means.

6. A liquid crystal display device comprising:
   a light generating unit for generating a light;
   a receiving container for receiving the light generating unit;
   a power supply section mounted on a rear surface of the receiving container, for supplying a power to the light generating unit;
   power supplying lines connected between the light generating unit and the power supply section, for supplying the power to the light generating unit, the power supplying lines having a portion disposed on the rear surface of the receiving container; and a fixing member formed on the rear surface of the receiving container for guiding the portion of the power supplying lines disposed on the rear surface of the receiving container to the power supply section and preventing the power supplying lines from being departed from the receiving container, wherein the fixing member comprises a plurality of projections spaced apart from one another at a predetermined distance so that the power supplying lines are placed between the projections.

7. The liquid crystal display device of claim 6, wherein the fixing member further comprises guide grooves formed on the rear surface of the receiving container, or an adhesive tape.

8. The liquid crystal display device of claim 6, wherein the light generating unit is a cold cathode type of a fluorescent lamp.

9. The liquid crystal display device of claim 6, wherein the receiving container includes a bottom chassis for receiving the light generating unit and a mold frame for receiving the bottom chassis, which has an opening formed in a bottom surface of the mold frame.

10. The liquid crystal display device of claim 9, wherein the power supply section is disposed on the rear surface of the bottom chassis and the fixing member is formed on the mold frame to be placed between the power supply section and the light generating unit.

* * * * *